(12) United States Patent
Higashi

(10) Patent No.: US 8,248,493 B2
(45) Date of Patent: Aug. 21, 2012

(54) VIDEO SIGNAL PROCESSING APPARATUS PERFORMING GAMMA CORRECTION BY CUBIC INTERPOLATION COMPUTATION, AND METHOD THEREOF

(75) Inventor: Fuminori Higashi, Kanagawa (JP)

(73) Assignee: Renesas Electronics Corporation, Kawasaki-shi, Kanagawa (JP)

( * ) Notice: Subject to any disclaimer, the term of this patent is extended or adjusted under 35 U.S.C. 154(b) by 1077 days.

(21) Appl. No.: 12/216,672

(22) Filed: Jul. 9, 2008

(65) Prior Publication Data
US 2009/0027559 A1   Jan. 29, 2009

(30) Foreign Application Priority Data
Jul. 23, 2007   (JP) ................. 2007-190888

(51) Int. Cl.
*H04N 5/202* (2006.01)
*H04N 9/69* (2006.01)
(52) U.S. Cl. ...................................... 348/254; 348/675
(58) Field of Classification Search .................. None
See application file for complete search history.

(56) References Cited

U.S. PATENT DOCUMENTS

| | | | | |
|---|---|---|---|---|
| 4,931,864 | A * | 6/1990 | Kawamura et al. | 358/519 |
| 5,012,163 | A * | 4/1991 | Alcorn et al. | 315/383 |
| 5,198,897 | A * | 3/1993 | Baldwin | 348/104 |
| 5,296,920 | A * | 3/1994 | Sakaue et al. | 348/675 |
| 5,929,417 | A * | 7/1999 | Hayashi et al. | 235/454 |
| 6,292,165 | B1 * | 9/2001 | Lin et al. | 345/690 |
| 6,404,936 | B1 * | 6/2002 | Katayama et al. | 382/283 |
| 6,606,093 | B1 * | 8/2003 | Gossett et al. | 345/441 |
| 6,816,155 | B1 * | 11/2004 | Ogawa | 345/207 |
| 6,831,634 | B1 * | 12/2004 | Shigeta | 345/213 |
| 6,833,876 | B1 * | 12/2004 | Pirjaberi | 348/674 |
| 7,253,845 | B2 * | 8/2007 | Rumreich et al. | 348/649 |
| 7,391,480 | B2 * | 6/2008 | Fukue et al. | 348/675 |
| 7,623,141 | B2 * | 11/2009 | Brown Elliott et al. | 345/690 |

(Continued)

FOREIGN PATENT DOCUMENTS
JP   2004-140702   5/2004

*Primary Examiner* — Brian Pendleton
*Assistant Examiner* — Jonathan V Lewis
(74) *Attorney, Agent, or Firm* — McGinn IP Law Group, PLLC

(57) ABSTRACT

A video signal processing apparatus includes a non-equidistant section determination circuit, a sample data register, and an interpolation computation circuit. The non-equidistant section determination circuit detects a non-equidistant section having different intervals between plural sample points set for the dynamic range of a video signal to be inputted. The sample data register holds the signal level (correction level) of a video signal after correction for each sample point. The interpolation computation circuit obtains the signal level of the video signal after correction by executing cubic interpolation computation with reference to the correction level. Here, a first section is defined as a section located on a lower signal level side and having intervals of X (X>0) between sample points, and a second section is defined as a section located on a higher level side and having intervals of Y (Y>0, X≠Y) between sample points. With respect to the border point between the first and the second sections, the interpolation computation circuit obtains the signal level of the video signal after correction by use of the correction level of a sample point added so that the second section can be formed on the lower level side and/or the first section can be formed on the higher level side.

13 Claims, 16 Drawing Sheets

U.S. PATENT DOCUMENTS

| | | | |
|---|---|---|---|
| 2002/0067414 A1* | 6/2002 | Tanji et al. | 348/254 |
| 2004/0046881 A1* | 3/2004 | Utagawa | 348/294 |
| 2005/0185839 A1* | 8/2005 | Matsubara | 382/167 |
| 2005/0253784 A1* | 11/2005 | De Greef et al. | 345/63 |
| 2006/0274217 A1* | 12/2006 | Bae et al. | 348/791 |
| 2008/0266413 A1* | 10/2008 | Cohen et al. | 348/222.1 |
| 2009/0010538 A1* | 1/2009 | Kim | 382/167 |

* cited by examiner

O : SAMPLE DATA

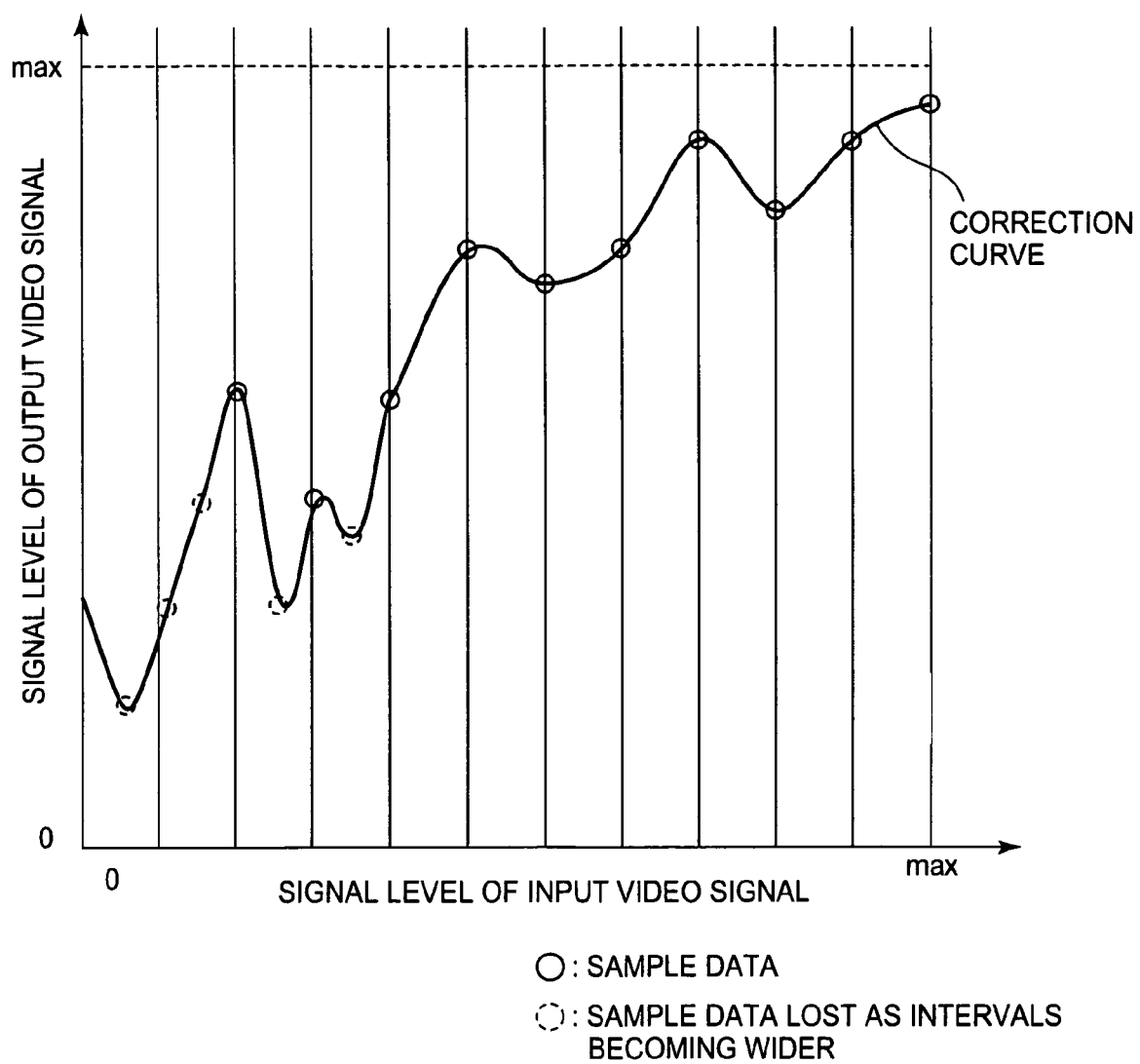

US 8,248,493 B2

VIDEO SIGNAL PROCESSING APPARATUS PERFORMING GAMMA CORRECTION BY CUBIC INTERPOLATION COMPUTATION, AND METHOD THEREOF

BACKGROUND OF THE INVENTION

1. Field of the Invention

The present invention relates to an apparatus and a method of video signal processing for performing gamma correction or degamma correction on a video signal. The present invention also relates to a display apparatus that performs gamma correction appropriate for the display employed for the apparatus when the gamma characteristic of the display employed differs from the characteristic of the gamma correction performed on the video signal that is inputted into the display apparatus. Specifically, the present invention relates to a display apparatus, such as a cathode-ray tube display, a liquid crystal display apparatus, and a plasma display panel, and to an apparatus and a method of video signal processing for achieving favorable gradation and contrast for the image displayed by the display apparatus.

2. Description of Related Art

The display apparatuses that display video signals, such as liquid crystal displays, plasma displays, and cathode-ray tube (CRT) displays have different gamma characteristics respectively. The television broadcasting signals, however, have a gamma characteristic that is adequate for CRT displays. Accordingly, when the signals are used for displaying on liquid crystal display apparatuses and plasma display apparatuses, the gamma correction having been applied to the video signals on the signal transmitter side has to be removed, and then gamma correction adequate for the display apparatuses that are used has to be applied to the video signal. For this reason, when video output corresponding to plural types of displays is performed, on the signal receiver side, it is necessary to employ gamma correction adequate for each type of displays.

Incidentally, corrections that are similar to gamma correction are performed for the purpose of setting contrast, and adjusting image quality, brightness, and black-and-white level or the like. Recent years, the amount of software processing has increased. The increase has in turn provoked an increased demand for a circuit design that is capable of achieving a smoother correction curve, which is capable of achieving a clearer and natural image by means of a small-scale circuit and with a smaller amount of software processing. Meeting such a demand requires highly sophisticated technologies.

In a video signal processing system as a related art, for the purpose of making the video signal adequate for the display apparatus, such as a liquid crystal display, a plasma display, and a cathode-ray tube (CRT) display, which displays the video signal, a gamma correction apparatus that is capable of handling plural display apparatuses at one time has been provided thus far. The provided apparatus, however, has a problem of its incapability of approximating accurately the gamma characteristic curve, or of requiring a very large-scale circuit for approximating accurately the gamma characteristic curve. A related technique to address this problem is disclosed in Patent Document 1.

FIG. 13 is a block diagram for showing a degamma correction apparatus of a related example disclosed in Patent Document 1. As FIG. 13 shows, a degamma correction apparatus 111 includes a sample data register 121, a sample data selection circuit 122, a kernel coefficient memory 123, a coefficient selection circuit 124, and an interpolation computation circuit 125.

Video signals are inputted through an input terminal 131 for video data (6 bit) before correction into both the coefficient selection circuit 124 and sample data selection circuit 122. The coefficient selection circuit 124 is bi-directionally connected to the kernel coefficient memory 123. Coefficient selection signals and coefficient value signals are transferred between the coefficient selection circuit 124 and the kernel coefficient memory 123. Into the kernel coefficient memory 123, coefficient memory write signals are inputted through a terminal 134 for coefficient group. The sample data selection circuit 122 is bi-directionally connected to the sample data register 121. Sample data selection signals and sample data signals are transferred between the sample data selection circuit 122 and the sample data register 121. Into the sample data register 121, sample data register write signals are inputted through a terminal 132 for gamma characteristic selection. Both the output of the coefficient selection circuit 124 and the output of the sample data selection circuit 122 become the input of the interpolation computation circuit 125. The output of the interpolation computation circuit 125 is connected to an output terminal 133 for video signal after correction. What has just been described is how the degamma correction apparatus 111 is configured.

The degamma correction apparatus 111 has such a function as follows. When the number of bits of the video signal inputted into the degamma correction apparatus 111 is m (m is a natural number), the degamma correction apparatus 111 supplies, among the m bits, the higher-order p bits (p is a natural number and p<m) to the sample data selection circuit 22 and supplies q bits among the m bits (p+q=m) to the coefficient selection circuit 24.

Next, descriptions of the operation for the gamma correction processing will be given with reference to FIGS. 13 to 15. FIG. 14 is an explanatory chart of sample data set in a degamma correction apparatus of a related example. FIG. 15 is a chart for showing coefficients stored in the kernel coefficient memory 123 of the degamma correction apparatus of the related example. In the degamma correction apparatus 111 shown in FIG. 13, equidistant division is performed on the signal level, between the maximum to the minimum, of the video signal inputted through the terminal 131 for the video signal before correction. Then, plural sample points are set in the sample data selection circuit 122 and in the sample data register 121. The sample point refers to a data that is compared with the input value produced by the equidistant division of the video signal level inputted into the sample data selection circuit 122, or refers to the data to be corrected on the input value. Suppose that the sample point is x coordinate in FIG. 14 representing the signal level of the input video signal and that the sample data is y coordinate in FIG. 14 representing the signal level of the output video signal. In this case, the relationship between the sample point and the sample data is expressed by the following formula 1.

$$(x, y) = (\text{sample point, sample data}) \quad (1)$$

The related degamma correction apparatus 111 is characterized by its employing the cubic interpolation computation to connect sample data as a smooth curve. Accordingly, next, descriptions of the cubic interpolation computation will be given in detail.

The cubic interpolation computation is an interpolation algorithm by use of a third-order polynomial. The kernel function h(x) of the cubic interpolation computation is expressed by the formula (2) given below. FIG. 15 is a graph of a case where a=−0.5 in the formula (2). In the formula, a is a variable for controlling the property of the interpolation function, and usually takes a value ranging from −0.5 to −2, approximately.

[Numerical Expression 1]

$$h(s) = \begin{cases} (a+2)|x|^3 - (a+3)|x|^2 + 1 & 0 \le |x| < 1 \\ a|x|^3 - 5a|x|^2 + 8a|x| - 4a & 1 \le |x| < 2 \\ 0 & 2 \le |x| \end{cases} \quad (2)$$

With reference to FIGS. 14 and 15, descriptions will be given as to the processing for obtaining, by use of the cubic interpolation computation, the signal level of the output video signal after the degamma correction for the signal level of the input video signal. FIG. 14 shows sample data set in the degamma correction apparatus at the time when the signal level of the output video signal (point indicated by ● on the degamma correction curve) is interpolated at point A of the signal level of the input video signal. With respect to the signal level of the input video signal on the horizontal axis, sample points are set by dividing equidistantly the signal level ranging from the minimum to the maximum. Here, four sample points (four points $C_{-2}$, $C_{-1}$, $C_1$, and $C_2$ indicated by 0 circled by dashed lines in FIG. 14) that are adjacent, from the two sides, to point A to be interpolated are extracted as the sample data. As to the value x in the formula (2) given above (hereafter, referred to as distance x), the difference in level among the adjacent sample points is equivalent to a distance "1." To put it differently, the distance x is obtained by dividing the difference in level from the signal level of the input video signal to the above-mentioned four sample points by the difference in level among the adjacent sample points.

Here, weighting coefficients for the four sample data (shown as $h_{-2}$, $h_{-1}$, $h_1$, and $h_2$ in FIG. 15) are obtained by substituting the calculated distance x into the formula (2).

The weighting coefficient is a commonly-used term in the interpolation computation and the like, and refers to the value obtained by dividing the weighted average by the total number of the weights. As shown in the following formula (3), the four sample data are multiplied by their respective weighting coefficients and then the total sum y of the products of the multiplications is obtained.

$$y = h_{-2} \cdot C_{-2} + h_{-1} \cdot C_{-1} + h_1 \cdot C_1 + h_2 \cdot C_2 \quad (3)$$

The total sum y obtained by the formula (3) is the degamma-corrected video signal level at point A. The sample data needed for the interpolation processing include one data for each of the four ranges of distance x: $-2 \le x < -1$; $-1 \le x < 0$; $0 \le x < 1$, $1 \le x < 2$. The value of the coefficient is obtained by means of the values of kernel coefficients (value of coefficient (h)) of ($h_{-2}$, $h_{-1}$, $h_1$, and $h_2$) shown in FIG. 15 corresponding respectively to the selected sample data.

Accordingly, in the degamma correction apparatus 111 of the related technique shown in FIG. 13, the video signals inputted through the input terminal 131 for video signal before correction is inputted into the coefficient selection circuit 124 and the sample data selection circuit 122. The kernel coefficient value obtained by the coefficient selection circuit 124 and the sample data selected by the sample data selection circuit 122 are used for performing the cubic interpolation computation expressed by the above-mentioned formula (3) in the interpolation computation circuit 125. Then, the video data after correction is outputted through the output terminal

[Patent Document 1] Japanese Patent Application Publication No. 2004-140702

The related degamma correction apparatus 111, however, performs the cubic interpolation computation, so that the setting of sample points has to be done only equidistantly. For this reason, in the related degamma correction apparatus 111, it is necessary to limit the sample points for gamma correction to equidistant setting. Accordingly, gamma correction is not possible by setting sample points with different distance from one another. This is a problem that the related degamma correction apparatus 111 has.

Remember that, in gamma correction, a correction curve with a steep slope has a large variation. Accordingly, accurate approximation in this case requires smaller intervals for the sampling and more number of sample points than in the case of a small slope. In the related technique, however, the intervals for the sampling are constant. Accordingly, when the sampling intervals are set for a correction curve having both sections with a steep slope and with a small slope, the setting of the sampling intervals that is adequate for the steep-slope section causes the setting of redundant sample points in the small-slope section. The redundancy in turn results in the increase in the software processing and the number of setting operations for setting the sample points. Conversely, the setting of the sampling intervals that is adequate for the small-slope section results in an insufficient number of sample points for the steep-slope section. The insufficiency in turn results in a problem. Specifically, accurate approximation is impossible.

Descriptions of this problem will be given with reference to FIG. 16 to 18. FIG. 16 is a chart showing a correction curve composed of sections with different slopes. FIG. 17 is a chart showing an example of setting the sampling intervals so as to be adequate for a steep slope. FIG. 18 is a chart showing an example of setting the sampling intervals so as to be adequate for a small slope.

In a case as shown in FIG. 16 where the correction curve has sections having a steep slope and requiring high accuracy as well as sections having a small slope and not requiring very high accuracy, the sampling intervals for the steep-slope sections have to be set finely for the purpose of interpolating the curve with high accuracy. Conversely, the sampling intervals for the small-slope sections, which have a small variation and do not require high accuracy, do not have to be set finely. Even when the sampling intervals are set coarsely, approximating the curve is still possible.

In the related technique, however, plural sample points are set by dividing the range of the signal level, from the minimum to the maximum, of the input video signal equidistantly, and then the cubic interpolation computation is performed using the sample data corresponding to the respective sample points. For this reason, setting of sampling intervals that depends on the slope is not possible. Accordingly, approximating a correction curve as shown in FIG. 16 causes a problem as described above. Specifically, the problem is the creation of redundant sample points or the shortage of sufficient number of sample points.

To be more specific, when the sampling intervals are set for the purpose of approximating the section which has a steep slope and which requires high accuracy in FIG. 16, the sampling has to be done equidistantly with fine sampling intervals as shown in FIG. 17. Redundant sample points are created, however, in the section which has a small slope and which do not require high accuracy. The redundancy in turn provokes an increase both in the amount of software processing and in the number of setting operation for setting the sample data. Conversely, when the sampling intervals are set equidistantly and coarsely as shown in FIG. 18 so as to be appropriate for the section which has a small slope and which do not require high accuracy, for the purpose to reduce the sample points, sample points needed for approximating the curve in the section which has a steep slope and which requires high accuracy are not provided sufficiently. The insufficiency in turn makes accurate approximation of the curve impossible.

SUMMARY OF THE INVENTION

An apparatus according to an exemplary aspect of the present invention is a video signal processing apparatus into which a video signal is inputted and which executes any one of gamma correction and degamma correction on the inputted video signal. The apparatus includes a section determination unit configured to detect a non-equidistant section having different intervals between a plurality of sample points set for a range from the minimum signal level to the maximum signal level of a video signal to be inputted, a correction level holding unit configured to hold the signal level of a video signal after correction for each sample point as a correction level, and an interpolation computation unit configured to obtain the signal level of the video signal after correction by executing cubic interpolation computation with reference to the correction level held by the correction level holding unit. In the video signal processing apparatus, while a border point is defined as a sample point to be a border between a first section located on a lower signal level side and having intervals of X (X>0) between sample points, and a second section located on a higher level side and having intervals of Y (Y>0, X≠Y) between sample points, the signal level of the video signal after correction is obtained by use of the correction level of a sample point added or designated so as to form the second section on the lower level side and/or the first section on the higher level side of the border point.

A method according to an exemplary aspect of the present invention is a video signal processing method in which a video signal is inputted and any one of gamma correction and degamma correction is executed on the inputted video signal. The method includes the detecting of a border point. The border point is a sample point located in a non-equidistant section having different intervals between a plurality of sample points set for a range from the minimum signal level to the maximum signal level of a video signal to be inputted. The border point is a border between a first section located on a lower signal level side and having intervals of X (X>0) between sample points, and a second section located on a higher level side and having intervals of Y (Y>0, X≠Y) between sample points. The method also includes the obtaining of the signal level of the video signal after correction corresponding to the signal level of the inputted video signal by executing cubic interpolation computation. The cubic interpolation computation is executed by referring to a correction level held in the correction level holding unit configured to hold the signal level of the video signal after correction for each sample point as the correction level. The cubic interpolation computation is executed by use of the correction level for a sample point added or designated so as to form the second section on the lower level side and/or the first section on the higher level side.

In the present invention, the signal level of the video signal after correction is obtained by referring to the correction level of the sample point added in the non-equidistant section with different intervals between sample points from one another, or added by designation from the exterior. Accordingly, the intervals between sample points do not have to be equidistant, but are allowed to be changed. As a consequence, in a case of a correction curve with a small slope, large intervals are permitted, and sample data is set without adding redundant sample points.

According to the present invention, it is possible to provide an apparatus and a method of video signal processing that can prevent the increase in the amount of software processing and in the number of setting operations.

BRIEF DESCRIPTION OF THE DRAWINGS

The above and other exemplary aspects, advantages and features of the present invention will be more apparent from the following description of certain exemplary embodiments taken in conjunction with the accompanying drawings, in which:

FIG. 18 is a chart for illustrating an example of sampling intervals that is set to be adequate for a small slope.

DETAILED DESCRIPTION OF THE EXEMPLARY EMBODIMENTS

A First Exemplary Embodiment

Figure 1:
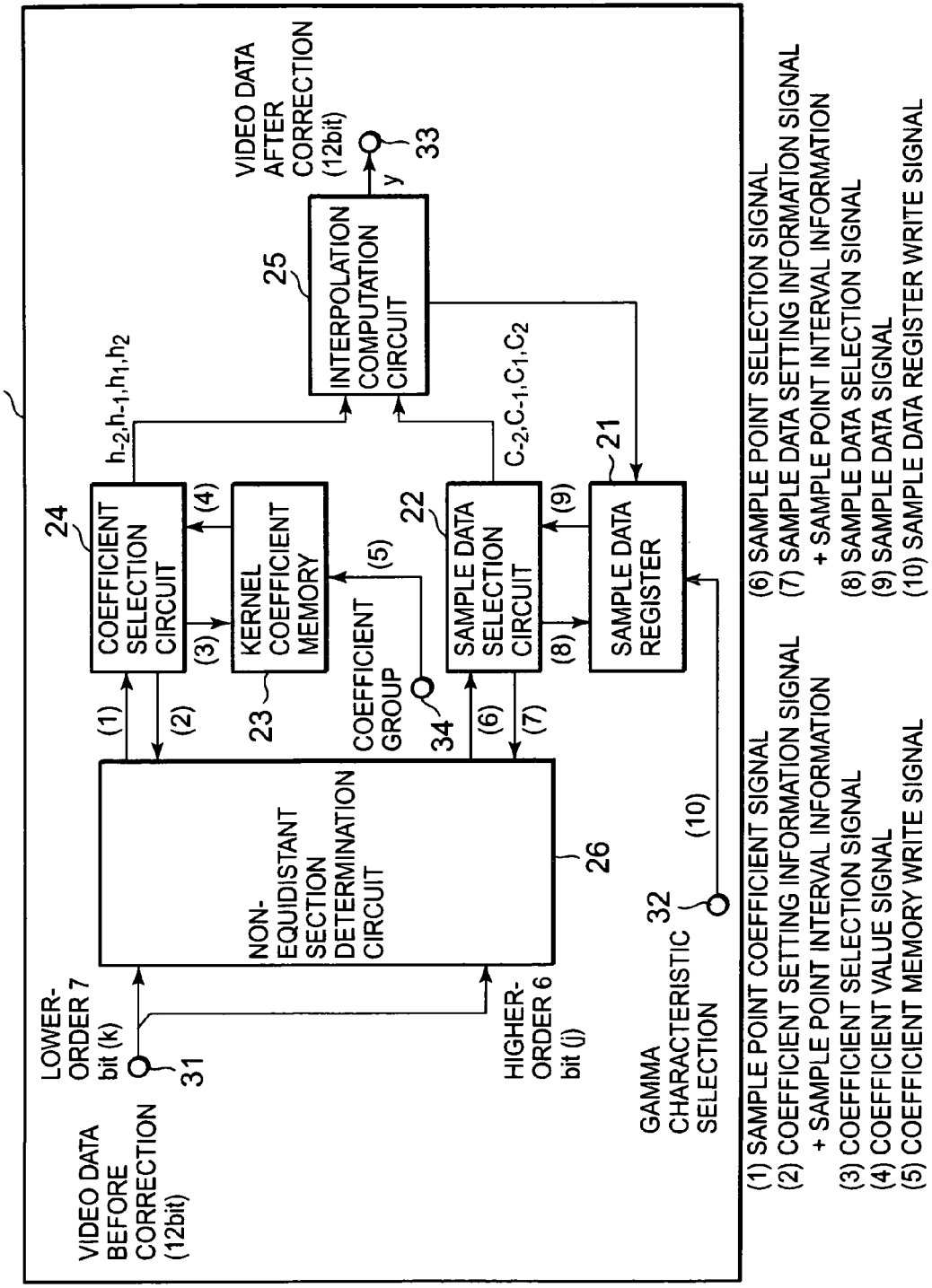
FIG. 1 is a block diagram for illustrating a gamma correction apparatus according to a first exemplary embodiment of the present invention.

FIG. 1 is a block diagram for showing a gamma correction apparatus according to a first exemplary embodiment of the present invention. The gamma correction apparatus 11 includes a sample data register 21, a sample data selection circuit 22, a kernel coefficient memory 23, a coefficient selection circuit 24, an interpolation computation circuit 25, and a non-equidistant section determination circuit 26.

The gamma correction apparatus 1, in accordance with the variation of the correction curve, the sample points (sampling points) with intervals that are not equidistant. Using these sample points thus set, the gamma correction apparatus 11 can create video data after correction by the cubic interpolation. Accordingly, no redundant sample points are set in the section with a small slope. Meanwhile, more sample points are set in the section with a steep slope, and accurate interpolation is made possible. To make the setting of sample points with different intervals possible, the gamma correction apparatus has the following two functions.

In this specification, the area having different intervals between adjacent sample points from one another is referred to as a non-equidistant section. A first function is a function of adding sample points within a non-equidistant section and of performing the processing of creating sample data (correction data) corresponding to the respective ones of the added sample points. A second function is a function of performing the processing of gamma correction by use of the sample data added by way of the first function.

Next, descriptions of each block will be given. Video signals are inputted into the non-equidistant section determination circuit 26 through an input terminal 31 for video signal before correction. As to the sample points set in plurality in a range of signal level of the input video signal from the minimum signal level to the maximum signal level, the non-equidistant section determination circuit 26 detects a non-equidistant section in which intervals between sample points differ from one another. Here, suppose a case where there is a first section located on a side with the lower signal level and having the interval X between sample points (X>0), and where there is a second section located on a side with the higher signal level and having the interval Y between sample points (Y>0, X≠Y). In this case, the sample point between the first section and the second section is referred to a border point. As will be described later, the non-equidistant section determination circuit 26 adds sample points so as to form a second section on the lower signal level side of the border point, and adds sample points so as to form a first section on the higher signal level side of the border point.

The non-equidistant section determination circuit 26 and the coefficient selection circuit 24 are bi-directionally connected to each other. Sample point coefficient signals are inputted from the non-equidistant section determination circuit 26 into the coefficient selection circuit 24 so as to obtain the coefficients of the respective sample points (including the added sample points). Meanwhile, sample point interval information that indicates the intervals of the sample points and coefficient setting information signals that are to be the trigger for the start of the determination of non-equidistant section are inputted from the coefficient selection circuit 24 into the equidistant section determination circuit 26.

The non-equidistant section determination circuit 26 and the sample data selection circuit 22 are bi-directionally connected to each other. Sample point selection signals are inputted from the non-equidistant section determination circuit 26 into the sample data selection circuit 22 so as to obtain sample points (including added sample points). Meanwhile, sample point interval information that indicates the intervals of the sample points and sample data setting information signals that are to be the trigger for the start of the determination of non-equidistant section are inputted from the sample data selection circuit 22 into the equidistant section determination circuit 26.

The coefficient selection circuit 24 and the kernel coefficient memory 23 are bi-directionally connected to each other. Coefficient selection signals indicating the distance X, which is to be described later, are inputted from the coefficient selection circuit 24 into the kernel coefficient memory 23. Coefficient value signals ($h_{-2}$, $h_{-1}$, $h_1$, and $h_2$) each of which corresponds to the distance X are inputted from the kernel coefficient memory 23 into the coefficient selection circuit 24. The coefficient selection circuit 24 acquires, from the coefficient memory 23, the coefficients for the cubic interpolation computation by means of the coefficient value signals on the basis of a kernel function with variables normalized by the distance between two adjacent sample points. In this case the four coefficients are calculated by inputting, into the variables of the kernel function, the distance X between the signal level of the input video signal and each of the sample points selected by the sample data selection circuit 24.

Kernel coefficient memory 23 is a memory storing a group of coefficients corresponding to the kernel functions. The kernel coefficient memory 23 is configured so that a group of coefficients can be written into the kernel coefficient memory 23 by use of an external apparatus. In this embodiment, coefficient memory write signals to write coefficient values into the memory are inputted into the kernel coefficient memory from a terminal 32 for coefficient group. An exterior CPU and other apparatuses write the coefficient values into the memory.

The sample data selection circuit 22 and the sample data register 21 are bi-directionally connected to each other. Sample data selection signals are inputted from the sample data selection circuit 22 into the sample data register 21 so as to select four sample data for the input video signal. Sample data signals ($C_{-2}$, $C_{-2}$, $C_1$, and $C_2$) including the selected sample data are inputted from the sample data register 21 into the sample data selection circuit 22. The sample data selection circuit selects two nearby sample points located on the higher signal-level side than the signal level of the input video signal and two nearby sample points located on the lower signal-level side than the signal level of the input video signal. By means of sample data signals, the sample data selection circuit 22 then acquires, from the sample data register 21, the sample data corresponding to the selected four sample points.

The sample data register 21 functions as a correction level keeping unit that keeps the correction level, which is the signal level of the video signal after correction for each sample point. Sample data register write signal for writing values of sample data is inputted from a terminal 32 for gamma characteristic selection into the sample data register 28. An exterior CPU and other apparatuses write the sample data into the sample data register 21.

The coefficient value signals ($h_{-2}$, $h_{-1}$, $h_1$, and $h_2$) from the coefficient selection circuit 24 and the sample data signals ($C_{-2}$, $C_{-2}$, $C_1$, and $C_2$) from the sample data selection circuit 22 are inputted into the interpolation computation circuit 25. The interpolation computation circuit 25 performs the cubic interpolation on the basis of the data thus inputted, and creates the video data (12 bit) after correction. The video data after correction is outputted through an output terminal 33 as the video data. In addition, when sample data for the added sample points are created, the sample data in question is inputted into the sample data register 21. Accordingly, the interpolation computation circuit 25 can obtain the signal level of the video signal after correction by use of the sample data (correction level) of the sample points added so as to form a second section on the lower signal level side of the above-described border point and/or by use of the sample data of the sample points added so as to form a first section on the higher signal level side of the above-described border point. Here, as will be described later, the additional sample points and their respective sample data can also be added by way of the inputting from the exterior.

The processing of adding the sample points and the sample data, which is the first function, starts with the inputting of a sample data register write signal and a coefficient memory write signal respectively into the gamma characteristic selection terminal 32 and the coefficient group terminal 34. Then, the non-equidistant section determination circuit 26 determines the intervals between sample points, and determines the sample points to be added. To create additional points, a kernel coefficient selection is performed both in the kernel coefficient memory 23 and in the coefficient selection circuit 24 while a sample data selection is performed both in the sample data register 21 and in the sample data selection circuit 22. Subsequently, using the kernel coefficient and the sample data that are selected for the creation of the additional sample data, a cubic interpolation computation is performed in the interpolation computation circuit 25, and the outcome of the cubic interpolation computation in the interpolation computation circuit 25 is stored as the additional sample data in the sample data register 21. Hereafter, this processing is referred to as the point addition processing.

In the processing of gamma correction, which is the second function, a kernel selection is performed by means of the non-equidistant section determination circuit 26, the kernel coefficient memory 23, and the coefficient selection circuit 24 in accordance with the level of the video signal inputted through the input terminal 31 for video data before correction. Then, using the additional sample data inputted into the sample data register 21 by way of the first function and using the existing sample data, a sample data selection is performed by means of the non-equidistant section determination circuit 26, the sample data register 21, and the sample data selection circuit 22. Subsequently, using both the kernel coefficient and the sample data thus selected, a cubic interpolation computation is performed in the interpolation computation circuit 25, and the video signal data is outputted through the output terminal 33 for the video data after gamma correction. Hereafter this processing is referred to as the gamma correction processing.

In summary, in the gamma correction apparatus according to this embodiment, firstly, the non-equidistant section determination circuit 26 detects the border point included in the non-equidistant section. Then, by referring to the sample data kept in the sample data register 21, sample points are added so as to form the second section on the lower signal-level side of the border point and/or to form the first section on the higher signal-level side of the border point. Subsequently, the interpolation computation circuit 25 creates the correction level of the additional samples, and the correction level thus created is then fed back to the sample data register 21 (the point addition processing). After that, the interpolation computation circuit 25 performs a cubic interpolation computation by use of the additional sample points and the existing sample points as well as their respective sample data. Thus, the interpolation computation circuit 25 obtains the signal level of the video signal after correction in accordance with the signal level of the inputted video signal (the gamma correction processing). In this way, the intervals between sample points do not have to be equidistant, but are allowed to be varied. As a consequence, addition of redundant sample points for the area with a wide interval is no longer necessary. Additional sample data can be set only for the areas that do need such addition.

Next, the configuration and the operation of the sample data register 21 to the interpolation computation circuit 25 in the gamma correction apparatus 111 will be described in detail with reference to FIG. 2. The descriptions are based on an example where the video signals inputted into the gamma correction apparatus 11 of FIG. 1 is represented by 12 bits. In addition, it is assumed that the minimum level of the inputted video signal is "800 (in hexadecimal numbers)" (two's complement notation; equivalent to −2048 in decimal numbers), and that the maximum level of the inputted video signal is "7FF (in hexadecimal numbers)" (two's complement notation; equivalent to 2047 in decimal numbers).

Figure 2:
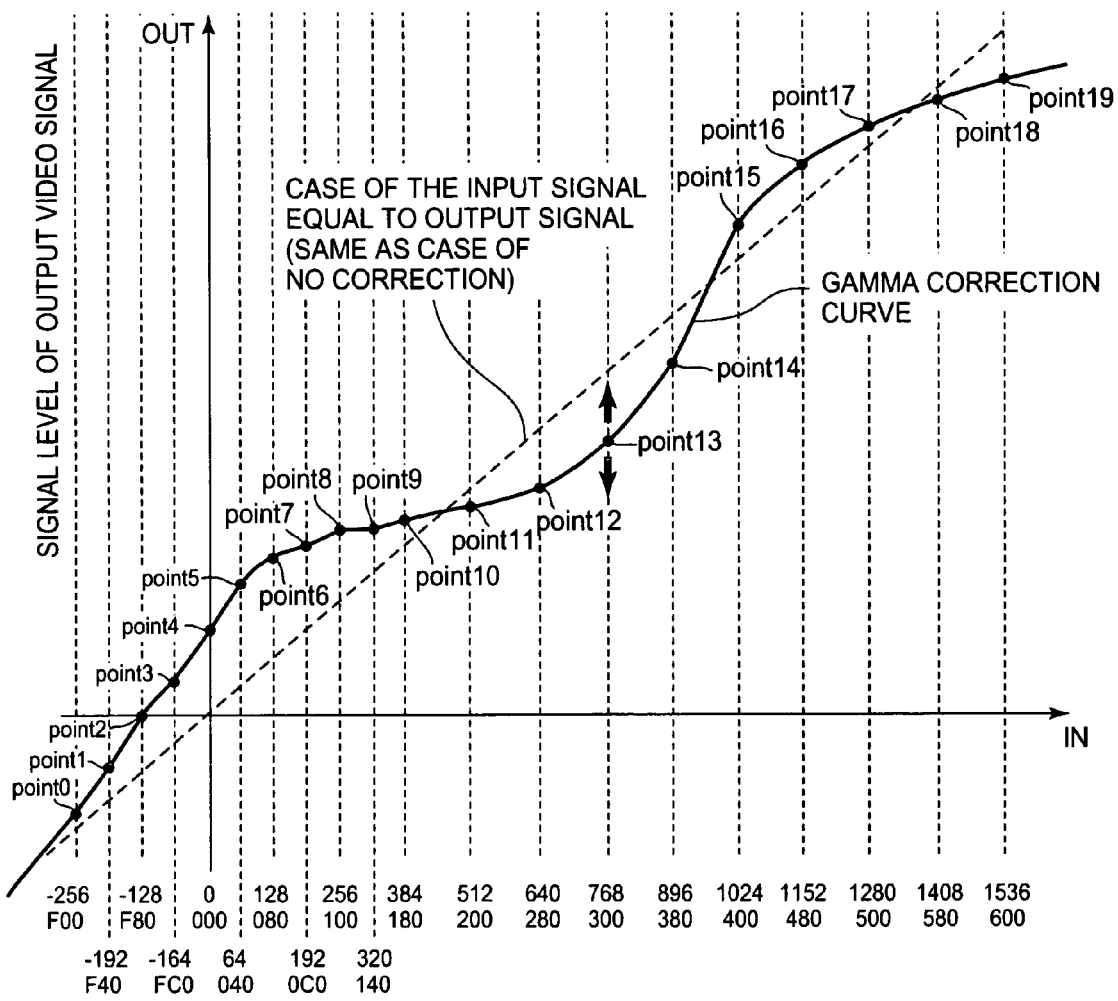
FIG. 2 is a chart for illustrating a gamma correction curve according to the embodiment of the present invention.

FIG. 2 is a chart for showing a gamma correction curve according to a first exemplary embodiment of the present invention. The sample data register 21 holds the sample data on the correction curve. The horizontal axis of FIG. 2 represents the signal level of the input video signal that is inputted through the input terminal 31 for video signal before correction, while the vertical axis represents the signal level of the output video signal that is outputted through the output terminal 33 for the video data after correction. Then, with the signal level of the input video signal −256 (in decimal numbers; equivalent to F00 in two's complement notation in hexadecimal numbers) being assumed to be the minimum sample point, nine sample points are set equidistantly, with intervals of 64 (in decimal numbers; equivalent to 040 in hexadecimal numbers) input levels, up to 256 level (in decimal numbers; equivalent to 100 in hexadecimal numbers). The sample data corresponding to the sample point at −256 (in decimal numbers) level is defined as point 0, the sample data corresponding to the sample point at −192 (in decimal numbers) is defined as point 1, and so on. In this way, the sample data corresponding to the sample point at 256 (in decimal numbers) level is defined as point 8, and nine sample data—point 0 to point 8—in total are set. In addition, from 384 (in decimal numbers; equivalent to 180 in hexadecimal numbers) level to 1536 (in decimal numbers; equivalent to 600 in hexadecimal numbers) level, sample points are set equidistantly, with intervals of 128 (in decimal numbers; equivalent to 080 in hexadecimal numbers) input levels. Then, the sample data corresponding to the sample point at 384 level (in decimal numbers) is defined as point 10, and, in the similar way, 10 sample data—point 10 to point 19—in total are set up to the sample data corresponding to the sample point at 1536 (in decimal numbers) level, which is defined as point 19.

As described above, in the gamma correction apparatus 11, the sample points are set by partitioning the dynamic range of the input video signal either by 6-bit width or 7-bit width. The section between the sample point at 256 level (in decimal numbers) of the sample data point 8 and the sample point at 384 level (in decimal numbers) of the sample data point 10 is a section where the intervals vary from intervals of 64 (in decimal numbers) level to intervals of 128 (in decimal numbers) level. To put it differently, the section is a non-equidistant section. Accordingly, the gamma correction apparatus 11 sets an additional sample point at 320 (in decimal numbers; equivalent to 140 in hexadecimal numbers) level following the above-described point addition processing, and performs the processing of adding sample data point 9 (point addition processing). Using a smooth curve starting from sample data point 0 to sample data point 19, the gamma correction apparatus performs the gamma correction processing on the video signal.

The sample data register 21 stores therein both the signal level of the output video signal corresponding to the intervals of 64 (in decimal numbers) input levels between sample data point 0 and sample data point 9 and the signal level of the output video signal corresponding to the intervals of 128 (in decimal numbers) input levels between sample data point 10 and sample data point 19. As described above, the intervals between sample points in the gamma correction curve of this example is smaller on the lower signal-level side of the input video signal than their counterpart on the higher signal-level side of the input video signal. Note that descriptions will be given later as to the case where the intervals between sample points are smaller on the higher signal-level side of the input video signal than their counterpart on the lower signal-level side of the input video signal.

Figure 14:
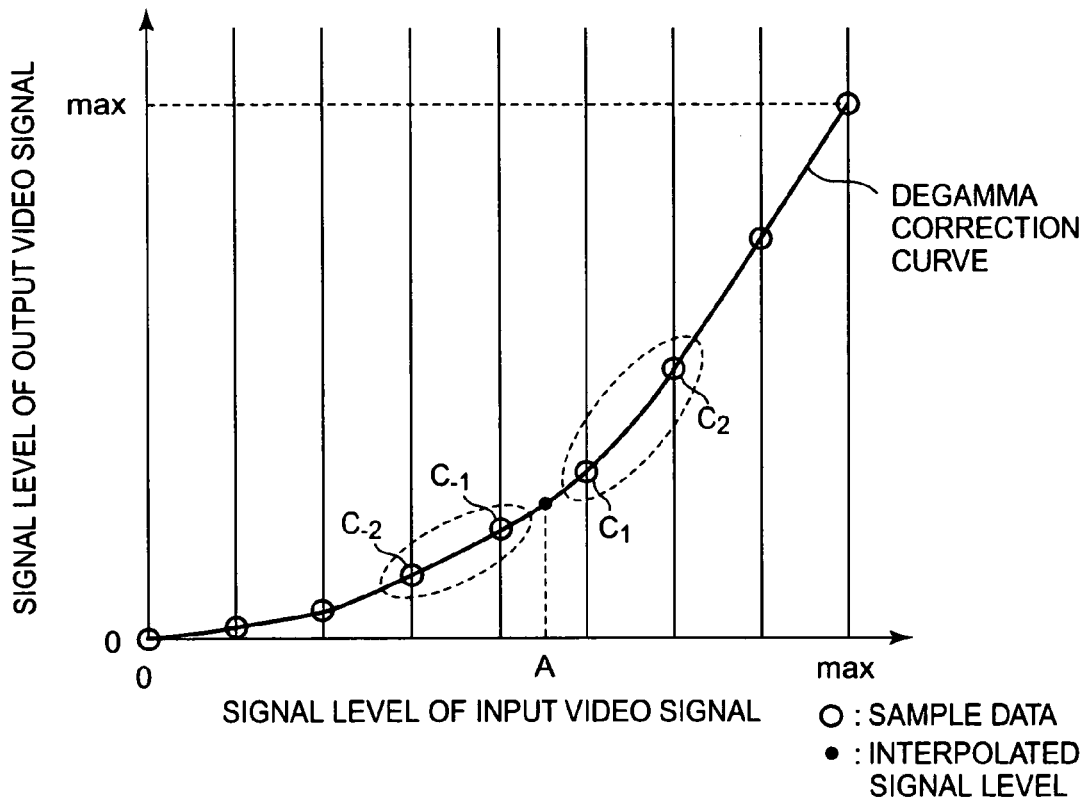
FIG. 14 is an explanatory diagram for sample data set in the degamma correction apparatus of the example.

The information on the sample points selected by the non-equidistant section determination circuit 26 is inputted as sample point selection information from the higher-order 6 bits of the video data before correction (12 bits) of FIG. 1 into the sample data selection circuit 22. On the basis of the information thus inputted on the sample point, the sample data selection circuit 22 detects, when, for example, as shown in FIG. 14, point A indicated by ● is the sample point inputted as the sample point selection information, the four sample points $C_{-2}, C_{-1}, C_1,$ and $C_2$ indicated by ○, which are adjacent to point A, located on the two sides of point A, and circled by dotted lines.

The sample data selection circuit 22, as described above, detects two sample points located near the signal level of the input video signal on the higher level side and two sample points near the signal level of the input video signal on the lower level side. The sample data selection circuit 22 then inputs the sample points thus detected into the sample data register 21 as the sample data selection signal. The sample data selection circuit, then, performs the processing of selecting four sample data corresponding to the detected four sample points. Accordingly, the sample data selection circuit obtains, by means of a sample data signal, the four sample data corresponding to the detected four sample points from the sample data stored in the sample data register 21. The sample data thus obtained is outputted, as interpolation data $(C_{-2}, C_{-1}, C_1,$ and $C_2)$, to the interpolation computation circuit 25.

The kernel coefficient memory 23 stores therein a specific coefficient group for the kernel function expressed by the formula 2, which is used for the cubic interpolation computation. The coefficients stored in the kernel coefficient memory 23 are obtained by normalizing the distance x to be inputted into the kernel function by the interval between adjacent sample points. Specifically, the distance x to be inputted into the kernel function is normalized by either 127 (in decimal numbers) or 63 (in decimal numbers). Accordingly, the distance x to be inputted into the kernel function that originally has values in a range $-2 \leq x < 2$ has a value in a range $-256$ (in decimal numbers)$\leq x < 256$ (in decimal numbers) when normalized by 127 (in decimal numbers). Alternatively, the distance x has a value in a range $-128$ (in decimal numbers)$\leq x < 128$ (in decimal numbers) when normalized by 63 (in decimal numbers).

The coefficient selection circuit 24 receives the sample point coefficient signal from the non-equidistant determination circuit 26. The sample point coefficient signal is a signal determined by the lower-order 7 bits, in signal level, of the input video signal that is inputted to the non-equidistant determination circuit 26 through the input terminal 31 for video signal before correction. The coefficient selection circuit 24 calculates, using the 7-bit sample point coefficient signal inputted into the coefficient selection circuit 24, the distances to the sample points of the respective four sample data $(C_{-2}, C_{-1}, C_1,$ and $C_2)$ outputted from the sample-data selection circuit 22, and obtains the distance x on the basis of the distances calculated above. The coefficient selection circuit 24 inputs the distance x as the coefficient selection signal into the kernel coefficient memory 23, receives four coefficient values $(h_{-2}, h_{-1}, h_1,$ and $h_2)$ from the kernel coefficient memory 23, and outputs the coefficient value signals $(h_{-2}, h_{-1}, h_1,$ and $h_2)$ to the interpolation computation circuit 25.

When the input video signal inputted through the input terminal 31 for video data before correction has a signal level that is located between the sample points with intervals of 128 (in decimal numbers) levels, the sample point coefficient signal to be inputted into the coefficient selection circuit 24 is the lower-order 7 bits of the signal level of the input video signal inputted through the input terminal 31 for video data before correction.

In the kernel coefficient memory 23, the range $-2 \leq x < 2$ is normalized to be the range $-256$ (in decimal numbers)$\leq x \leq 256$ (in decimal numbers) by multiplying 127 (in decimal numbers). Accordingly, the 7-bit sample point coefficient signal to be inputted into the coefficient selection circuit 24 represents the distance in a range of $0 \leq x < 128$. Now, the sample point coefficient signal is represented by i, the coefficient value $h_{-2}$ of the range $-256 \leq x < -128$ corresponding to the sample data $C_{-2}$ is the coefficient value for x=i+128, and the coefficient value $h_{-1}$ of the range $-128 \leq x < 0$ corresponding to the sample data $C_{-1}$ is the coefficient value for x=i. The coefficient value $h_1$ of the range $0 \leq x < 128$ corresponding to the sample data $C_1$ is the coefficient value for x=128−i, and the coefficient value $h_2$ of the range $128 \leq x < 256$ corresponding to the sample data $C_2$ is the coefficient value for x=256−i.

Note that when the input video signal inputted through the input terminal for video data before correction has a signal level that is located between the sample points with intervals of 63 (in decimal numbers) levels, the sample point coefficient signal to be inputted from the non-equidistant section determination circuit 26 into the coefficient selection circuit 24 is a 7-bit value obtained by multiplying the lower-order 6 bits by 2. Accordingly, for the input into the coefficient selection circuit 24, 7-bit signal is inputted irrespective of which of the two sides, either the side with intervals of 128 (in decimal numbers) levels or the side with intervals of 64 (in decimal numbers) levels, the signal level of the input video signal to be inputted through the input terminal for video data before correction is located in.

The interpolation computation circuit 25 performs the interpolation computation expressed by the formula (3) on the basis of the interpolation data $(C_{-2}, C_{-1}, C_1,$ and $C_2)$ outputted from the sample data selection circuit 22 and the coefficient values $(h_{-2}, h_{-1}, h_1,$ and $h_2)$. The output value y obtained by the formula (3) is outputted, at the gamma correction, through the output terminal 33 for video data (12 bit) after correction shown in FIG. 4, and is outputted to the sample data register 21 at the point addition processing of this embodiment.

$$y = h_{-2} \cdot C_{-2} + h_{-1} \cdot C_{-1} + h_1 \cdot C_1 + h_2 \cdot C_2 \qquad (3)$$

Figure 4:
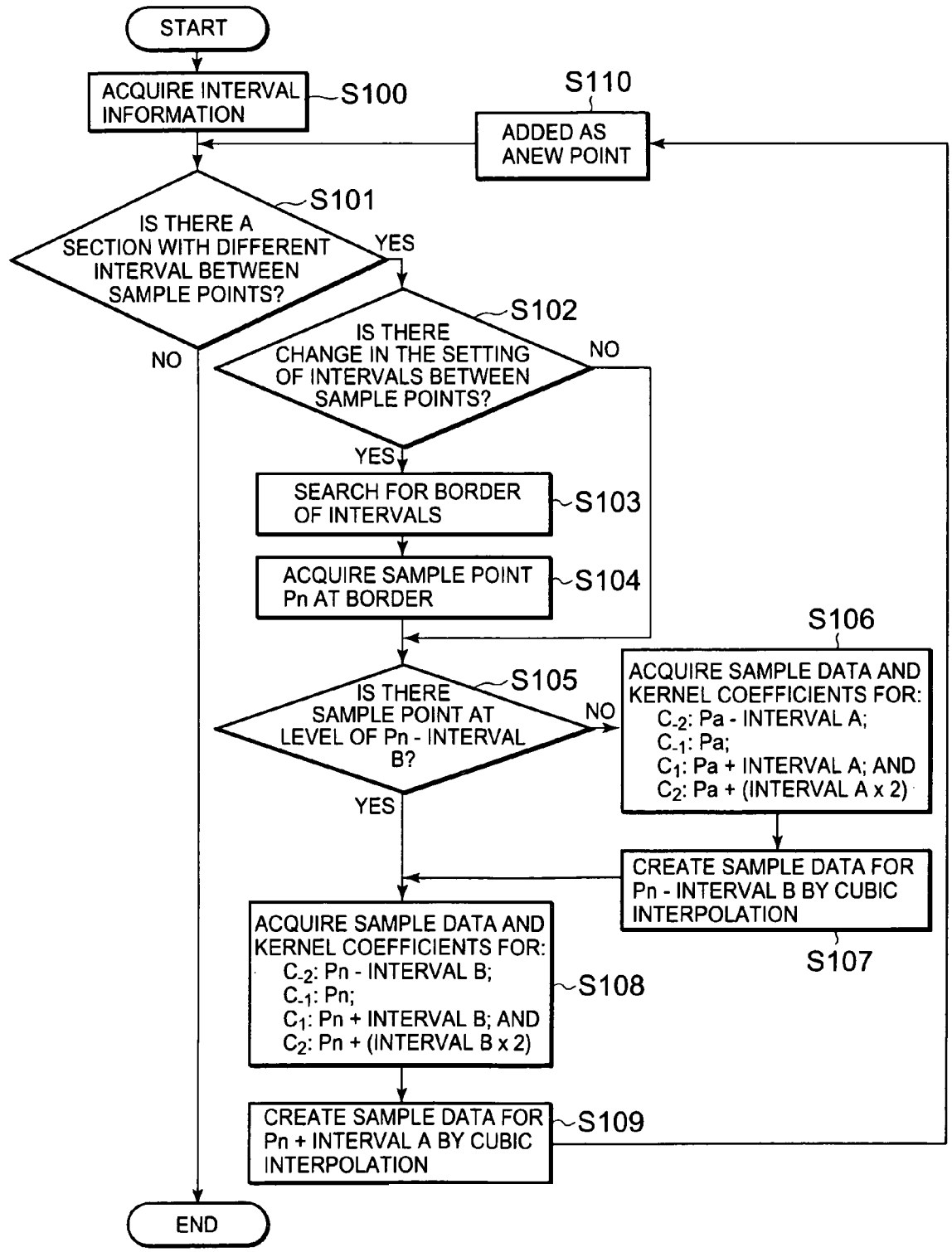
FIG. 4 is a flowchart for describing a point addition processing procedure for a non-equidistant section according to the embodiment of the present invention.
Figure 5:
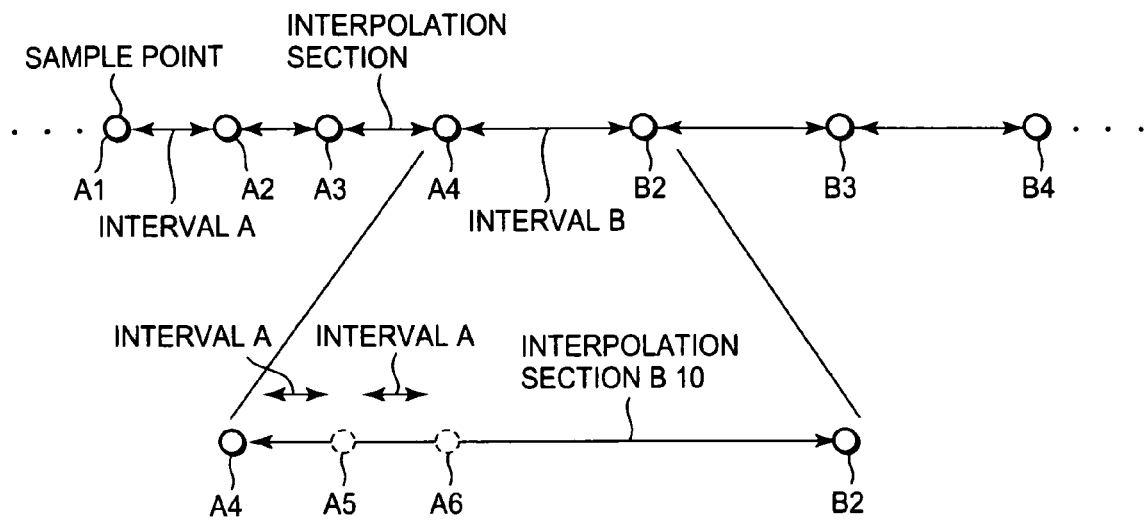
FIG. 5 is a chart for illustrating point addition processing in a case of wide intervals according to the embodiment of the present invention.

Next, the point addition processing, which is the first function of the gamma correction apparatus 11 shown in FIG. 1 will be described in detail with reference to FIGS. 3 to 5. FIGS. 3 to 5 show the point addition processing performed in the gamma correction apparatus 11 in both of the cases where the setting of the sample data for the gamma curve on which the correction processing is performed is done through the terminal 32 for gamma characteristic selection and where the change of kernel coefficient memory 23 is done through the coefficient group terminal 34.

Specifically, FIGS. 3A, 3B, 3C and 3D are diagrams for illustrating the point addition processing for the non-equidistant section according to this embodiment. Here, the sample points are arranged with the signal level of the input video signal plotted on the axis, and the processing for creating sample point A5 as an additional point is described. FIG. 4 is a flowchart of the point addition processing procedure for the non-equidistant section according to this embodiment. FIG. 5 is a diagram for illustrating the point addition processing in a case where interval A×2<interval B.

Figure 3A:
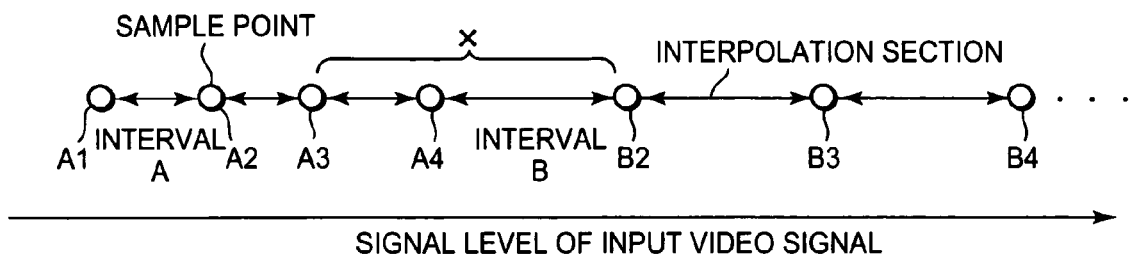
FIGS. 3A, 3B, 3C and 3D are charts for illustrating point addition processing for a non-equidistant section according to the embodiment of the present invention.

FIG. 3A is an image diagram for illustrating the sample points A1 to A4 set with A-level intervals (hereafter, referred to as intervals A) and the sample points A4, and B2 to B4 set with B-level intervals (hereafter, referred to as intervals B). What is shown here is, for example, the image diagram of the sample points on the two sides of the sample point at 256 (in decimal numbers) level in FIG. 2. The bi-directional arrows between sample points in FIG. 3A show interpolation sections where the cubic interpolation computation is performed.

In FIG. 3A, the intervals between sample points are not equidistant. The intervals vary in the section X on a higher level side of the sample point A4 where the signal level of the input video signal is higher than that of the sample point A4. This example shows the state before the point addition processing is performed. Accordingly, similar to the related example, no cubic interpolation computation is possible on the section X where no equidistant sample points exist. As described above, the gamma correction apparatus 11 has a function of adding sample points and sample data (point addition processing), which enables the execution of the cubic interpolation computation in the state of setting shown in FIG. 3A.

Figure 3B:
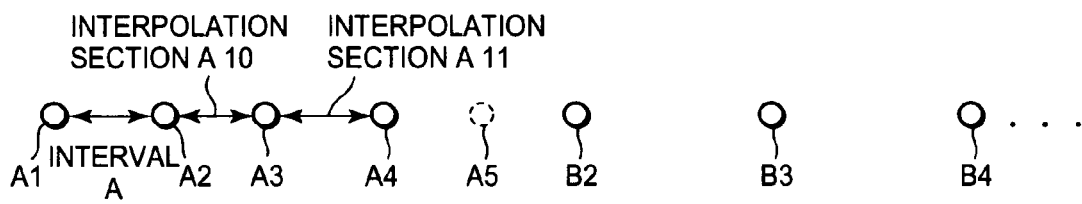

FIG. 3B illustrates the section where the cubic interpolation computation is executed with reference to the sample points set as shown in FIG. 3A and the section located on a side of the sample point A4 and having a lower level of the input video signal lower than that of the sample point A4. When the level of the input video signal is located in the interpolation section A10, the cubic interpolation computation circuit selects the sample points A1 to A4, and executes the cubic interpolation computation by use of the sample data and the kernel coefficient values corresponding to the selected sample points. All the sample points selected for the interpolation section A10 are equidistantly located with intervals A, so that the cubic interpolation computation can be executed.

Among the sample points existing in FIG. 3A, the sample points A2, A3, A4, and B2 are selected for the interpolation section A11. In this case, the intervals between the sample points A2 to A4 are intervals A, but the interval between the sample points A4 and B2 is an interval B. The four sample points are not equidistant, so that no cubic interpolation computation can be executed.

Here, the gamma correction apparatus 11 enables the cubic interpolation computation for the interpolation section A11 by means of the point addition function, that is, by adding a sample point A5 indicated by ○ of a dashed line in FIG. 3B. The sample point A5 is a sample point having an interval A with the sample point A4 and located on the side of the sample point A4 where the level of the input video signal is higher than that of the sample point A4. Accordingly, the sample point A5 has a level of (the level of the A4+an interval A). The sample data corresponding to the sample point A5 can be obtained by means of the cubic interpolation computation circuit 25 and by using the sample data and the kernel coefficient values corresponding to the selected sample points shown in FIG. 3D. As shown in FIG. 3D, in the interpolation section B10, the sample points B1, A4, B2, and B3 are equidistantly located with intervals B. Accordingly, the sample data corresponding to the sample point A5 can be obtained by selecting these sample points and by executing the cubic interpolation computation using the sample data and the kernel coefficient values corresponding to the selected sample points. In order to execute the cubic interpolation computation for the interpolation section BIO shown in FIG. 3D, the sample point B1 indicated by ○ of a dashed line in FIG. 3D is necessary. Descriptions of the way of creating the sample point B1 will be given below with reference to FIG. 3C.

Figure 3C:
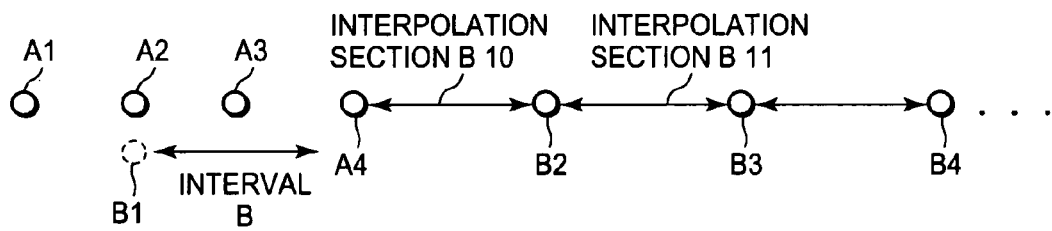
Figure 3D:
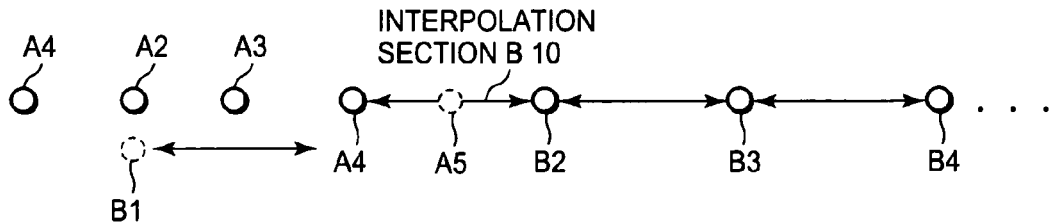

FIG. 3C illustrates the section on which the cubic interpolation computation is executed by use of the sample points set as shown in FIG. 3A. The section illustrated in FIG. 3C is located on a side of the sample point A4 and has a higher input video signal level than the sample point A4. When the input video signal level is located in the interpolation section B11, the cubic interpolation computation is executed by selecting the sample points A4 and B2 to B4, and by use of the sample data and kernel coefficient values corresponding to the selected sample points. The sample points selected for the interpolation section B11 are located equidistantly with intervals B, so that the cubic interpolation computation can be executed.

Among the sample points existing in FIG. 3A, the sample points A3, A4, B2, and B3 are selected for the interpolation section B10. In this case, the intervals between the sample points A3 and A4 is an interval A, but the intervals between the sample points A4, B2, and B3 are intervals B. The four sample points are not equidistant, so that no cubic interpolation computation can be executed.

The gamma correction apparatus 11 enables the cubic interpolation computation for the interpolation section B10 by creating a sample point B1 indicated by 9 of a dashed line in FIG. 3C. The sample point B1 is a sample point having an interval B with the sample point A4 and located on the side of the sample point A4 where the level of the input video signal is lower than that of the sample point A4. Accordingly, the sample point B1 has a level of (the level of the A4—an interval B). The sample data corresponding to the sample point B1 can be obtained by means of the cubic interpolation computation circuit. Assume that the input video signal level of the sample point B1 (the level of the A4—an interval B) is equal to or higher than the level of the sample point A2, and is lower than the level of the sample point A3. In this case, the sample point B1 exists in the interpolation section A10. Accordingly, the sample data corresponding to the level of the sample point B1 can be obtained by selecting the sample points A1 to A4 that are located equidistantly with intervals A and by executing the cubic interpolation computation using the sample data and the kernel coefficient values corresponding to the sample points A1 to A4.

Since the sample point B1 shown in FIG. 3C is created in this way, the cubic interpolation computation can be executed by use of the sample points B1, A4, B2, and B3 that are equidistantly located with intervals B in FIG. 3D. Accordingly, the determination of the sample data corresponding to the sample point A5 can be made possible.

The procedure for adding the sample point A5 shown in FIGS. 3B, 3C, and 3D, and adding the sample data corresponding to the sample point A5 will be described below with reference to FIG. 4. Here, assume that, as shown FIG. 3A, the sample points A1 to A4 are set with intervals A while the sample points A4, and B2 to B4 are set with intervals B. Note that, here, both the sample point B1 and the sample data corresponding to the sample point B1 are also created because these are necessary for the addition of the sample point A5.

When sample data are set into the sample data register 21 through the terminal 32 for gamma characteristic selection shown in FIG. 1, the information on sample point intervals and the information on sample data setting are inputted into the non-equidistant section determination circuit 26 from the sample data register 21 via the sample data selection circuit 22. The information on sample point intervals from the sample data selection circuit 122 includes the information on all the sample points. In addition, through the terminal 32 for the gamma characteristic selection, sample data indicating the values of the sample points on the correction curve shown in FIG. 2 are written by means of the sample data register write signal. After that, both the information on sample point intervals and the information on sample data setting are inputted into the non-equidistant determination circuit 26.

Figure 15:
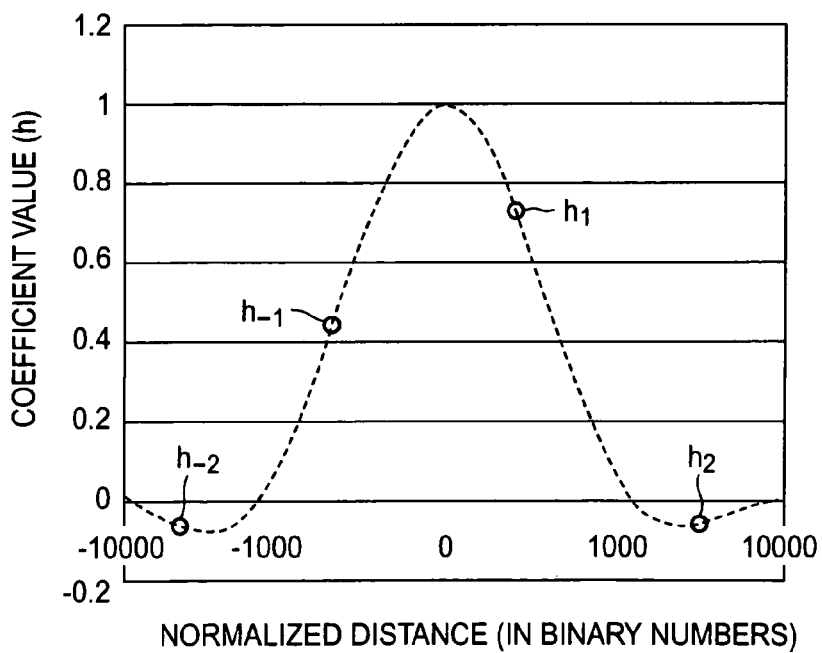
FIG. 15 is a chart for illustrating coefficients stored in a kernel coefficient memory of the degamma correction apparatus.
Figure 16:
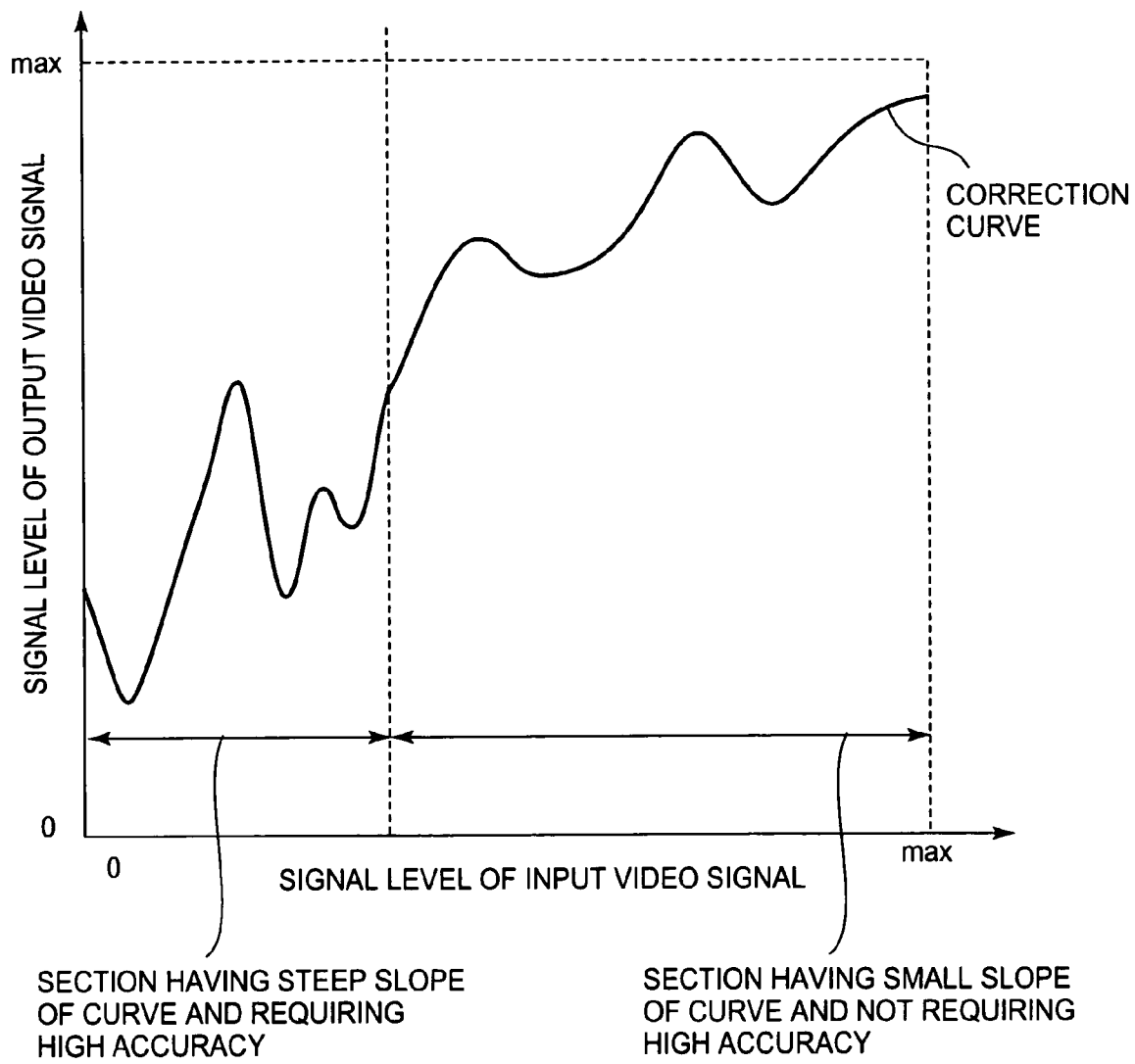
FIG. 16 is a chart for illustrating a correction curve having sections of different slopes.
Figure 17:
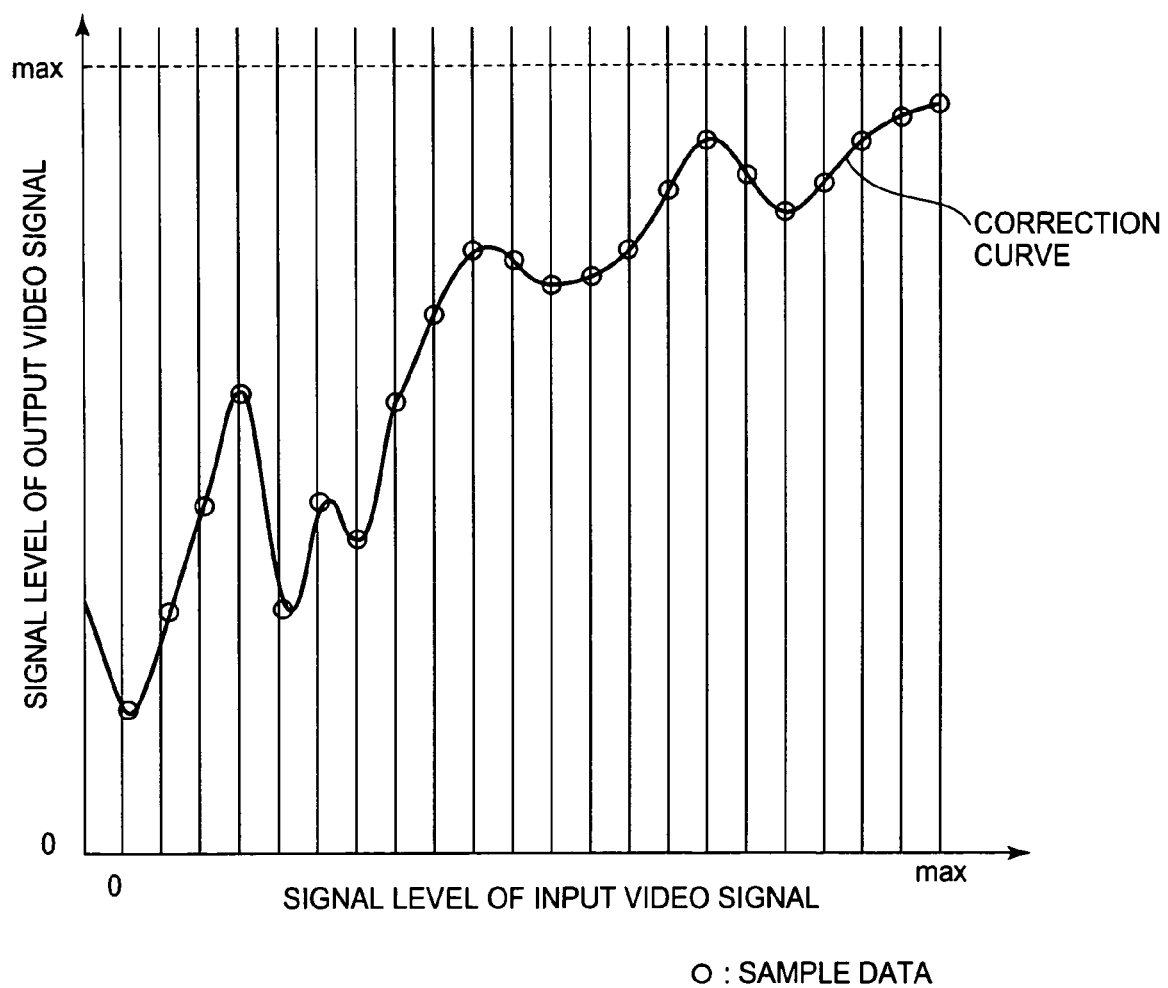
FIG. 17 is a chart for illustrating an example of sampling intervals that is set to be adequate for a steep slope.

In addition, when the kernel coefficient values are set in the kernel coefficient memory 23 through the coefficient group terminal 34, both the information on sample point intervals and the information on coefficient setting are inputted into the non-equidistant section determination circuit 26 from the kernel coefficient memory 23 via the coefficient selection circuit 24. The information on sample point intervals from the coefficient selection circuit 124 includes the information on the number used for the normalization of the coefficient values. In the example shown in FIG. 2, the intervals between points are either 63 or 127, so that the information that 63 and 127 are used for the normalization are inputted. Moreover, the coefficient values obtained from FIG. 15 normalized by 127 are written through the coefficient group terminal 34. After that, both the information on sample point intervals and the information on coefficient setting are inputted into the non-equidistant section determination circuit 26. The non-equidistant section determination circuit 26 obtains the differences between the sample points by use of the information on all of the sample points from the sample data selection circuit 122, then compares the differences thus obtained with the information from the coefficient selection circuit 124, and then puts these two sorts of information together to determine the sample point intervals. In short, the non-equidistant section determination circuit 26 checks the intervals between the sample points on the basis of the two sorts of information on sample point intervals, and then makes all encompassing determination of non-equidistant sections.

On receiving the information on sample point intervals and the information on sample data setting, as well as the information on sample point intervals and the information of coefficient setting, the non-equidistant section determination circuit 26 starts the point addition processing. Note that the descriptions given in this embodiment is based on the assumption that the processing to be described below starts with both the writing of the sample data through the terminal 32 for gamma characteristic selection and the writing of the coefficient values through the coefficient group terminal 34. The processing to be described below, however, starts with any one of the writing of the sample data through the terminal 32 for gamma characteristic selection and the writing of the coefficient values through the coefficient group terminal 34.

As shown in FIG. 4, on starting the point addition processing, the non-equidistant section determination circuit 26 acquires the information on sample point intervals from both the coefficient selection circuit 24 and the sample data selection circuit 22 (step S100). On the basis of this information on sample point intervals, the non-equidistant section determination circuit 26 determines whether there are sections with varying intervals between the sample points (step S101). When there are not any sections with varying intervals between sample points, no addition of sample points or of sample data is necessary. Accordingly, in such a case, the processing is finished here.

When any non-equidistant sections with varying intervals between the sample points are identified at step S101, whether there has been any change in the setting of the intervals between the sample points is checked (step S102). When there is a change, having been made at step S101, of the intervals between the sample points, the border at which the change in the intervals between the sample points occurs is identified (step S103), and the sample point located at the border (hereafter, referred to as Pn) where the change in the intervals occur is obtained (step S104). Among the sample points obtained by partitioning the level from the minimum input video signal level to the maximum level by the sample point intervals set through the terminal 32 for gamma characteristic selection and through the coefficient group terminal 34 shown in FIG. 1, the Pn is a sample point of which the distance with the adjacent sample point located on its lower-level side differs from the distance thereof with the adjacent sample point located on its higher-level side. An example of the Pn is the sample point A4 shown in FIG. 3A. The number n of the Pn is an integer $0 \leqq n$, and is determined by the number of sample points to be added. When no change in the interval of the sample points has been made at step S102, the Pn kept in the non-equidistant section circuit 26 is used. Accordingly, in this case, the processing at steps S103 and S104 is skipped.

Next, the procedure of step S105 onward will be described. The non-equidistant section determination circuit 26 checks whether there is a sample point at a position of (Pn−interval B) located on a side of the Pn and having a lower input video signal level than that of the Pn (step S105). When there is a sample point identified at the level of Pn−interval B at step S105, no addition of sample points is necessary. Accordingly, in such a case, the operational flow proceeds to step S108. When no sample point located at the level of Pn−interval B is identified at step S105, a sample point is added at the level of Pn−interval B. Then, steps S106 and S107 are carried out to execute the cubic interpolation computation and to create the sample data.

Specifically, firstly at step S106, the non-equidistant section determination circuit 26 adds a sample point at the level of Pn−interval B (for example, the sample point B1 shown in FIG. 3C). Then, in order to create the sample data for the sample point B1, the non-equidistant section determination circuit 26 outputs the sample point selection signal to the sample data selection circuit 22 and outputs the sample point coefficient signal to the coefficient selection circuit 24.

The sample data selection circuit 22 selects, on the basis of the sample point selection signal, two sample points that are located close to and on the lower-level side of the input video signal level—specifically, one at the level of Pa—interval A and the other at the level of Pa. The Pa mentioned here is referred to a sample point located closest to the level of Pn−interval B and on its lower side of the input video signal level. For example, in FIG. 3C, Pn is the sample point A4, the sample point at A4−interval B is B1, and the sample point Pa located on the lower-level side of the sample point B1 and closest to B1 is the sample point A2. In addition, The sample data selection circuit 22 selects two sample points that are located close to and on the higher-level side, specifically, one at the level of Pa+interval A and the other at the level of Pa+interval A×2. In this way, the sample data selection circuit selects four sample points in total, and acquires, from the sample data register 21, sample data ($C_{-2}$, $C_{-1}$, $C_1$, and $C_2$) corresponding to these four sample points as the sample data signals.

The coefficient selection circuit 24 executes coefficient selection on the basis of the sample point coefficient signal, and acquires the kernel coefficient values ($h_{-2}$, $h_{-1}$, $h_1$, and $h_2$) as the coefficient value signal from the kernel coefficient memory 23. The sample data signal ($C_{-2}$, $C_{-1}$, $C_1$, and $C_2$) acquired by the sample data selection circuit 22 at step S106 is outputted to the interpolation computation circuit 25, and the kernel coefficient value signal ($h_{-2}$, $h_{-1}$, $h_1$, and $h_2$) acquired by the coefficient selection circuit 24 is outputted to the interpolation computation circuit 25. The interpolation computation circuit 25 executes cubic interpolation computation by use of these sample data signal ($C_{-2}$, $C_{-1}$, $C_1$, and $C_2$) and the coefficient value signal ($h_{-2}$, $h_{-1}$, $h_1$, and $h_2$). The outcome of the interpolation computation is stored, as the sample data at the level of Pn−interval B, in the sample data register 21 (step S107), and the operational flow proceeds to step S108.

At step S108 onward, the procedure for creating the sample points located with intervals A on the higher-level side of the Pn and creating the sample data is executed. An example of the sample points added at step S108 onward is A5 of FIG. 3B.

Assume that $C_{-2}$ is the sample data for the sample point (B1) at the input video signal level of Pn−interval B, $C_{-1}$ is the sample data for the sample point (A4) at the level of Pn, $C_1$ is the sample data for the sample point (B2) at the level of Pn+interval B, and $C_2$ is the sample data for the sample point (B3) at the level of Pn+(interval B×2). Accordingly the sample data and the kernel coefficients are acquired (step S108). Cubic interpolation computation is executed by use of the data acquired at step S108, sample data (additional point) is created at the level of Pn+interval A (step S109), and the created sample point is stored as a new, additional point in the sample data register 21 (step S110). The sample point to be added is at the level of (Pn+interval A=A5), and the sample data for the added sample point is the outcome of the cubic interpolation computation.

Following step S110, the operational flow goes back to step S101. When it is still necessary to add another point, the above-described procedure is repeated so as to create a point. Otherwise, that is, when there is not a position with a different interval, it is no longer necessary to add an extra point, so that the series of operations are finished.

FIG. 5 is an image diagram for illustrating the point addition processing in a case where the intervals on the higher-level side are wider, and the processing for the case will be described below. The relationship between the interval A and the interval B is expressed by the following formula (4).

$$\text{Interval } A \times 2 < \text{interval } B \quad (4)$$

In the interpolation section B10 ranging from the sample point A4 to the sample point B2, two or more additional sample points, such as the sample points A5 and A6 indicated by ○ with a dotted line, are set. It is natural that the more additional points are set, the smoother curve can be obtained. Also in FIG. 5, two or more sample points can be added.

Next, the gamma correction, which is the second function of the gamma correction apparatus 11 shown in FIG. 1, will be described in detail with reference to FIGS. 6 and 7.

FIG. 6 is a diagram for illustrating the point selection processing for the non-equidistant section according to this embodiment. When gamma correction is executed plural times by means of cubic interpolation computation for the non-equidistant section with the additional sample point being the border and by use of the sample points and the sample data added by the point addition processing, sample points located within the section for the cubic interpolation computation are selected in accordance with the intervals.

Figure 6A:
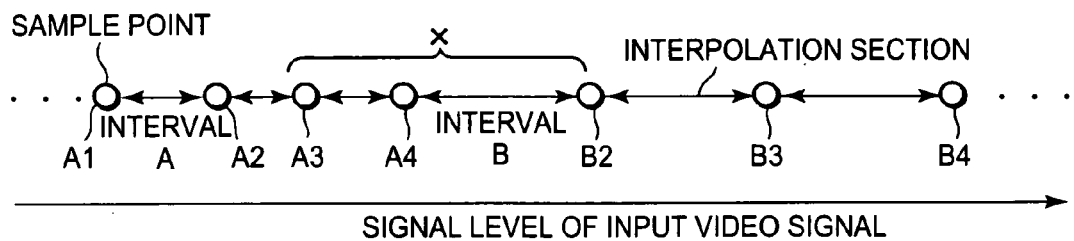
FIGS. 6A and 6B are charts for illustrating point selection processing for a non-equidistant section according to the embodiment of the present invention.
Figure 7:
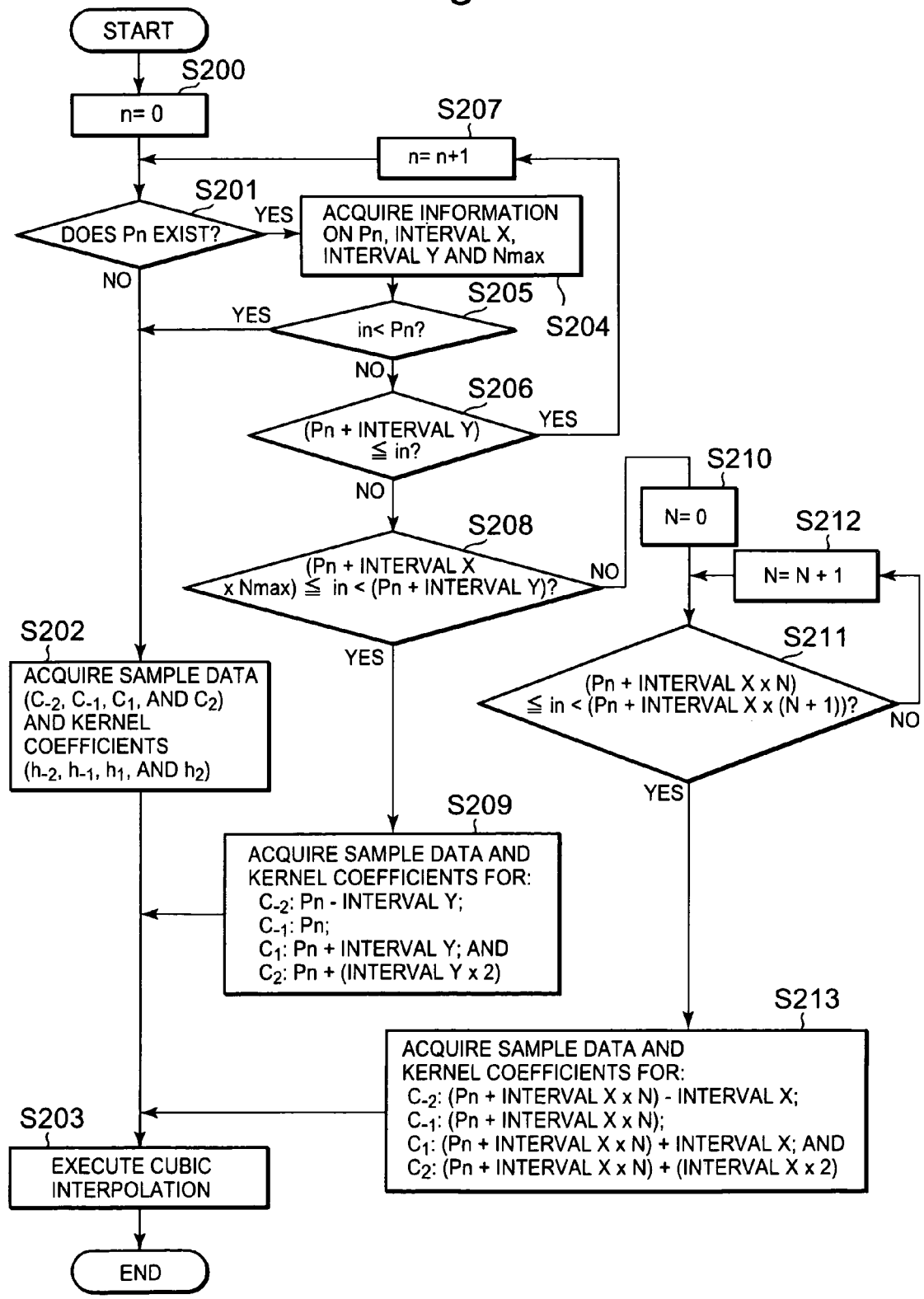
FIG. 7 is a flowchart describing a processing procedure of point selection and gamma correction according to the embodiment of the present invention.

FIG. 7 is a flowchart showing the processing procedure of the point selection and the gamma correction for the non-equidistant section according to this embodiment. In FIG. 6A, while the signal level of the input video signal is plotted on the axis, the sample points are arranged with intervals A or intervals B. In FIG. 6A, the sample points A1, A2, A3, and A4 are arranged with intervals A while the sample points A4, B2, B3, and B4 are arranged with intervals B. The relationship between the interval A and the interval B in FIG. 6A is "interval A:interval B=1:2." This indicates that the section denoted by X is a non-equidistant section.

Figure 6B:
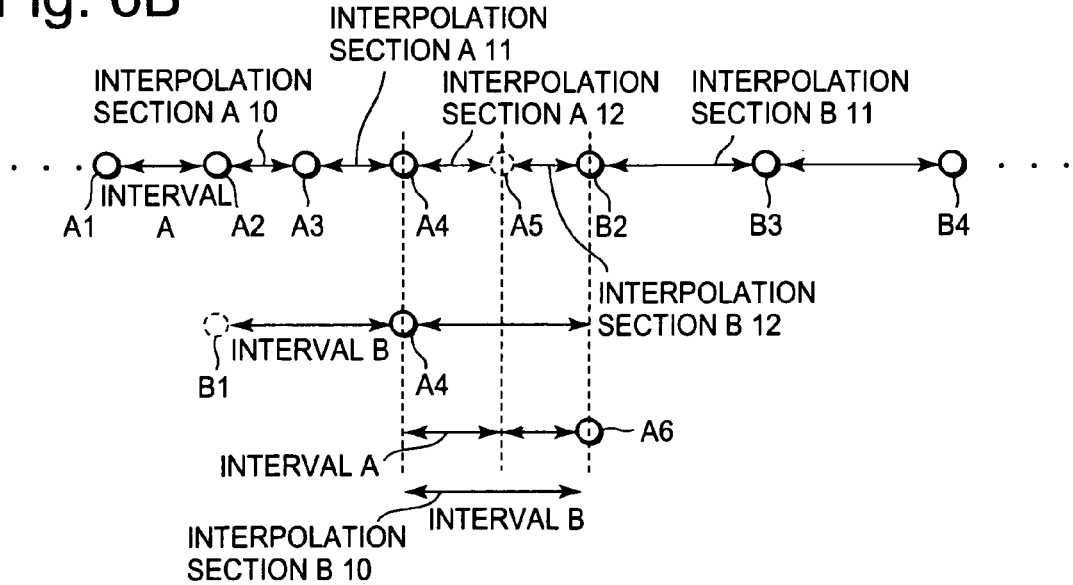

FIG. 6B illustrates the processing for selecting four sample points to be used for the cubic interpolation computation in the non-equidistant section according to this embodiment and for executing the gamma correction according to this embodiment. The sample points A1 to A4 and B2 to B4 in FIG. 6B are the same as those in FIG. 6A. Additional sample points B1, A5, and A6 (indicated by ○ with a dotted line) shown in FIGS. 3 to 5 also exist. The sample point B1 is a sample point having an interval B with the sample point A4 and located on the side of the sample point A4 where the level of the input video signal is lower than that of the sample point A4. The sample point A5 is a sample point having an interval A with the sample point A4 and located on the side of the sample point A4 where the level of the input video signal is higher than that of the sample point A4. The sample point A6 is a sample point having an interval A with the sample point A5 and located on the side of the sample point A5 where the level of the input video signal is higher than that of the sample point A5. Since in FIG. 6B, interval A:interval B=1:2 as in FIG. 6A, the sample point B1 and the sample point A2 are the same sample point. Similarly, the sample point A6 and the sample point B2 are the same sample point. For this reason, no addition of a new sample point is executed for the sample point A6.

In FIG. 6B, gamma correction is executed for the interpolation section A10 by selecting the four sample points A1 to A4. Meanwhile, gamma correction is executed for the interpolation section B11 by selecting the four sample points A4, and B2 to B4. The sample points A1 to A4 selected for the interpolation section A10 are the sample points that are arranged equidistantly with intervals A while the sample points A4, and B2 to B4 selected for the interpolation section B11 are the sample points that are arranged equidistantly with intervals B.

The interpolation section A11, the interpolation section A12, and the interpolation section B12 defined from the sample point A3 to the sample point B2 are the sections where gamma correction is executed by selecting additional sample points following the point addition processing according to this embodiment. For the interpolation section A11, the sample points A2, A3, A4, and A5 are selected to execute gamma correction. Accordingly, the gamma interpolation executed for the interpolation section A11 uses the sample points that are equidistantly arranged with intervals A.

The gamma correction for the interpolation section B10 is executed by dividing the interpolation section B10 into two interpolation sections A12 and B12 with the added sample point A5 being the border. The interpolation section A12 is defined between the sample points A4 and A5 while the interpolation section B12 is defined between the sample points A5 and B2. For the interpolation section A12, the sample points A3 to A5, and B2 are used to execute gamma correction on the sample points that are equidistantly arranged with intervals A. For the interpolation section B12, the sample points A2, A4, B2, and B3 are used to execute gamma correction on the sample points that are equidistantly arranged with intervals B.

The gamma correction apparatus 11 shown in FIG. 1 starts the gamma correction processing with the input of the video signal into the non-equidistant section determination circuit 26 through the input terminal 31 for video data before correction.

At the start of the gamma correction processing, the non-equidistant section determination circuit 26 set n=0 (S200), and checks whether there is a sample point Pn serving as the border at which intervals change (S201). As described above, among the sample points obtained by partitioning the input video signal level from the minimum level to the maximum level by the sample point intervals set through the terminal 32 for gamma characteristic selection and through the coefficient group terminal 34 shown in FIG. 1, the Pn is a sample point of which the distance with the adjacent sample point located on its lower-level side differs from the distance thereof with the adjacent sample point located on its higher-level side. The number n of the Pn is an integer $0 \leq n$ and is determined by the number of sample points to be added. When there is no Pn, all the intervals between the sample points are equal to one another. Accordingly, the operational flow proceeds to step S202, where the non-equidistant section determination circuit 26 selects the sample points that are equidistantly arranged.

On the basis of the level of the signal inputted through the input terminal 31 for video signal before correction, the non-equidistant section determination circuit 26 outputs the sample point selection signal to the sample data selection circuit 22, and outputs the sample point coefficient signal to the coefficient selection circuit 24. In response to this input, the sample data selection circuit 22 acquires four sample data ($C_{-2}$, $C_{-1}$, $C_1$, and $C_2$) from the sample data register 21 while the coefficient selection circuit 24 acquires four kernel coefficient values ($h_{-2}$, $h_{-1}$, $h_1$, and $h_2$) from the kernel coefficient memory 23 (step S202). The four sample data ($C_{-2}$, $C_{-1}$, $C_1$, and $C_2$) and the four kernel coefficient values ($h_{-2}$, $h_{-1}$, $h_1$, and $h_2$) are similar to the respective counterparts in the above-described case of FIG. 4.

The sample data ($C_{-2}$, $C_{-1}$, $C_1$, and $C_2$) acquired by the sample data selection circuit 22 and the kernel coefficient values ($h_{-2}$, $h_{-1}$, $h_1$, and $h_2$) acquired by the coefficient selection circuit 24 are inputted into the interpolation computation circuit 25 to execute cubic interpolation computation (step S203), and the processing is finished. In this way, video data (12 bit) after correction shown in FIG. 1 is outputted, as the outcome of the gamma interpolation processing, through the output terminal 33.

When a sample point is identified as Pn at step S201, the non-equidistant section determination circuit 26 acquires information on interval X, interval Y and Nmax (step S204). The interval X refers to the interval between sample points on the lower-level side of Pn while the interval Y refers to the interval between sample points on the higher-level side of Pn. The term Nmax refers to the number obtained by the number of points added −1, with intervals X to the section from the level of Pn to the level of Pn+interval Y. Specifically, Nmax is the number of sample points A5 and A6 in FIG. 6D. For example, in FIG. 6B, Pn is the sample point A4, the interval X is the interval A, the interval Y is the interval B. The sample point A5 is the only point that is added to the section from A4 to A4+interval B, so that Nmax=0.

Subsequently, the non-equidistant section determination circuit 26 compares the level of the signal inputted through the input terminal 31 for video signal before correction (hereafter, the signal is referred to as video signal in) with the level of Pn (step S205). When it is determined at step S205 that the video signal in is at a level lower than the level of Pn, the sample points arranged equidistantly with intervals A exist in the section located on the lower-level side of the sample point A4 as shown in FIG. 6B. Accordingly, cubic interpolation computation can be executed by use of the sample points arranged equidistantly. For this reason, the section, unlike the interpolation section B10, does not have to be partitioned. Accordingly, the operational flow proceeds to step S202.

When it is determined at step S205 that the video signal in is at a level higher than the level of Pn, whether the video signal in is equal to or higher than the level of Pn+interval Y is checked at step S206. For example, it is shown that the video signal in is equal to or higher than the level of the sample point B2 shown in FIG. 6B. When (Pn+interval Y)$\leq$in, sample points that are arranged equidistantly with intervals B exist as shown in FIG. 6. For this reason, the section, unlike the interpolation section B10, does not have to be partitioned. Accordingly, the operational flow proceeds to step S207, and 1 is added to n (S207), and whether a sample point Pn exists is checked (step S201). For example, in FIGS. 6A and 6B, n=0 and A4 is the only sample point Pn.

When it is determined at step S205 that the video signal in is at a level lower than the level of Pn, the two sample points each located on the closest sides both of the higher-level and lower-level sides to the input video signal level of the video signal in are selected. The sample data and the kernel coefficients for these sample points are acquired (step S202), then, cubic interpolation computation is executed (step S203), and then the processing is finished. In this way, the outcome of the gamma correction processing is outputted. When it is determined at step S205 that the video signal in is at a level lower than the level of Pn, the sample points selected at step S202 are, for example, the sample points (A1 to A4 in the interpolation section A10, and A2 to A5 in the interpolation section A11) that are equidistantly arranged with intervals A in FIG. 6B.

When it is determined at step S206 that (Pn+interval Y)$\leq$in, the two sample points each located on the closest sides both of the higher-level and lower-level sides to the input video signal level of the video signal in are selected. The sample data and the kernel coefficients for these sample points are acquired (step S202), then, cubic interpolation computation is executed (step S203), and then the processing is finished. In this way, the outcome of the gamma correction processing is outputted. When it is determined at step S206 that (Pn+interval Y)$\leq$in, the sample points selected at step S202 are, for example, the sample points (A4, and B2 to B4 in the interpolation section B11) that are equidistantly arranged with intervals B in FIG. 6B.

When it is not determined at step S206 that (Pn+interval Y)$\leq$in, that is, Pn$\leq$in<(Pn+interval Y), the processing at step S208 onward is executed. When Pn$\leq$in<(Pn+interval Y), it is indicated that the video signal in is at a level within the interpolation section B10 shown in FIG. 6B.

At step S208, whether the video signal in is at a level equal to or higher than the level of Pn+interval X×Nmax and whether the video signal in is at a level lower than the level of Pn+interval Y are determined. When it is determined at step S208 that (Pn+interval X×Nmax)$\leq$in <(Pn+interval Y), in the case shown, for example, in FIG. 6B, in which Nmax=0, the sample point A5 is expressed by Pn+interval X×Nmax and the sample point B2 is expressed by Pn+interval Y. In addition, it is demonstrated that the video signal in is in the interpolation section B12.

When it is determined at step S208 that (Pn+interval X×Nmax)≦in <(Pn+interval Y), the non-equidistant section determination circuit 26 determines the level of the video signal in. The non-equidistant section determination circuit 26 outputs the sample point selection signal to the sample data selection circuit 22, and outputs the sample point coefficient signal to the coefficient selection circuit 24. What has just been described occurs, in the example shown in FIG. 6B, for example, when the input video signal in is at a level between A5 and B2. From the sample data register 21, the sample data selection circuit 22 selects: the sample data of the sample point (A2) at a level of Pn−interval Y for the sample data $C_{-2}$; the sample data (A4) of the sample point at a level of Pn for the sample data $C_{-1}$; the sample data of the sample point (B2) at a level of Pn+interval Y for the sample data $C_1$; and the sample data of the sample point (B3) at a level of Pn+(interval Y×2) for the sample data $C_2$. The coefficient selection circuit 24 acquires four kernel coefficient values ($h_{-2}$, $h_{-1}$, $h_1$, and $h_2$) from the kernel coefficient memory 23 (S209), and then executes cubic interpolation computation (S203). After that, the processing is finished. In this way, the outcome of the gamma correction processing is outputted through the output terminal 33 for video data (12 bit) after correction shown in FIG. 1. When the video signal in is at a level, for example, located in the interpolation section B12 shown in FIG. 6B, the sample point selection executed at step S209 includes the selection of the sample points A2, A4, B2, and B3 as well as the execution of the cubic interpolation computation by use of the sample points A2, A4, B2, and B3 arranged equidistantly with intervals B.

When it is not determined at step S208 that (Pn+interval X×Nmax)≦in <(Pn+interval Y), the video signal in has the relationship shown in step S211, that is, (Pn+interval X×N)≦in <(Pn+interval X×(N+1)). Then, by setting the integer N=0 (step S210), comparison is made (step S211) whether the video signal in is at a level equal to or higher than the level of (Pn+interval X×N) and whether the video signal in is at a level lower than the level of (Pn+interval X×(N+1)). When it is determined at step S211 that (Pn+interval X×N)≦in <(Pn+interval X×(N+1)), the operational flow proceeds to step S213. Otherwise, 1 is added to N (S212), and the comparison shown at step S211, that is, (Pn+interval X×N)≦in <(Pn+interval X×(N+1)), is repeated. The step S211 means the determination of sections, for every interval A, from the level of Pn to the level of (Pn+interval X×Nmax). Since the sample point A5 is the only sample point that is added, for example, in FIG. 6B, step S211 is not repeated. Only when N=0, the comparison is made. While N=0, the video signal in positioned at a level located in the interpolation section A12 allows the relationship Pn≦in <Pn+interval X (interval A in FIG. 6) to be satisfied in the case of FIG. 6B.

When it is determined at step S211 that (Pn+interval X×N)≦in<(Pn+interval X×(N+1)), the non-equidistant section determination circuit 26 determines the level of the video signal in. The non-equidistant section determination circuit 26 outputs the sample point selection signal to the sample data selection circuit 22, and outputs the sample point coefficient signal to the coefficient selection circuit 24. Then, at step S213, the sample data and the kernel coefficient values are acquired. At step S213, the sample data of the sample point at a level of (Pn+interval X×N)—interval X is selected for the sample data $C_{-2}$. The sample data of the sample point at a level of Pn+interval X×N is selected for the sample data $C_{-1}$. The sample data of the sample point at a level of (Pn+interval X×N)+interval X is selected for the sample data $C_1$. The sample data of the sample point at a level of (Pn+interval X×N)+(interval X×2) is selected for the sample data $C_2$. After the acquiring of the sample data and of the kernel coefficient values at step S213, cubic interpolation computation is executed (step S202), and then the processing is finished. In this way, the outcome of the gamma correction processing is outputted through the output terminal 33 for video data (12 bit) after correction shown in FIG. 1.

The sample point selection executed at step S213 means, in a case shown, for example, in FIG. 6B, the inputting of the video signal in for the interpolation section A12, the selection of the sample points A3 to A5, and B2 while N=0, and the execution of the cubic interpolation computation by use of the sample points A3 to A5, and B2 arranged equidistantly with intervals A.

Next, description with reference to FIG. 6 will be given of the reasons why gamma correction is made possible by executing the procedure for adding sample points and sample data to the non-equidistant section, and by executing, plural times, the cubic interpolation computation for the non-equidistant section by partitioning the section with the added sample point being used as the border.

In the case shown in FIG. 6B, the interpolation section All and the interpolation section B10 are, as described above, the sections in which the selection of equidistant sample points is impossible due to the varying intervals between sample points. What is made possible by creating the sample point A5 so as to select sample points arranged equidistantly for the interpolation section All is the gamma correction executed by selecting four sample points that are equidistantly arranged with intervals A. For the interpolation section All, with the procedure for adding sample data, the cubic interpolation computation is made available to be executed by use of the sample point A5. Accordingly, for the interpolation section All, the execution of the gamma correction by use of a smooth curve is made possible.

Subsequently, gamma correction for the interpolation section B10 is executed by dividing the interpolation section B10 at the sample point A5 into two interpolation sections A12 and B12. For the interpolation section A12, cubic interpolation computation is executed by selecting the sample points A3 to A5, and B2, that is, by use of the sample points that are arranged equidistantly with intervals A. For the interpolation section B12, cubic interpolation computation is executed by selecting the sample points A2, A4, B2, and B3, that is, by use of the sample points that are equidistantly arranged with intervals B. As described above, the interpolation section A12 and the interpolation section B12 included in the interpolation section B10 include the sample data for the sample points A3 to A5 arranged with intervals A and the sample data for the sample points B2 and B3 arranged with intervals B. Accordingly, by carrying out the procedure for executing plural times of cubic interpolation computation for a non-equidistant section that has been divided into plural sections at an additional sample point A5 used as the border, gamma correction by use of a smoother curve than that in a case where the cubic interpolation is executed by treating the interpolation section B10 as the only section can be executed.

In this embodiment, the video signal before correction from the terminal 31 becomes the input for the non-equidistant section determination circuit 26, and the output of the non-equidistant section determination circuit 26 becomes the input for the coefficient selection circuit 24 and for the sample data selection circuit 22. Then, the output of the coefficient selection circuit 24 and the output of the sample data selection circuit 22 are inputted into the interpolation computation circuit 25. The output of the interpolation computation circuit 25 is connected to the output terminal 33 for video data after correction, and is also inputted into the sample data register 21. In addition, this embodiment includes a step of adding a sample point and sample data to the non-equidistant section, and a step of executing cubic interpolation computation by making the computation be divided into plural times of computation with the added sample point being the border. Accordingly, the intervals between sample points can be varied freely. As a consequence, in a case where sample points are set with different intervals, this embodiment can solve the problem that the gamma correction cannot be executed unless redundant sample points are added to a section with large intervals. In addition, sample data can be set without adding redundant sample points. As a consequence, this embodiment can solve the problem of causing an increase in the software processes and in the number of setting operations.

A Second Exemplary Embodiment

The descriptions of the first exemplary embodiment are based on the point addition and the gamma correction executed in a case where the intervals between the sample points are narrow on the lower signal level side and where the intervals between the sample points are wide on the higher signal level side. The descriptions of a second exemplary embodiment is based on the point addition and the gamma correction executed in the opposite case, that is, in a case where intervals between the sample points are wide on the lower signal level side and where the intervals between the sample points are narrow on the higher signal level side. For the sake of simplicity, the descriptions are given by dividing the case of the first exemplary embodiment and the case of the second exemplary embodiment, but, in practice, a step is provided to determine whether the intervals between sample points on the lower signal level side are larger than the intervals between the sample points on the higher signal level side, or vice versa. In accordance with the determination result, one of the processing according to the first exemplary embodiment and the processing according to the second exemplary embodiment is selected and is executed.

Figure 8:
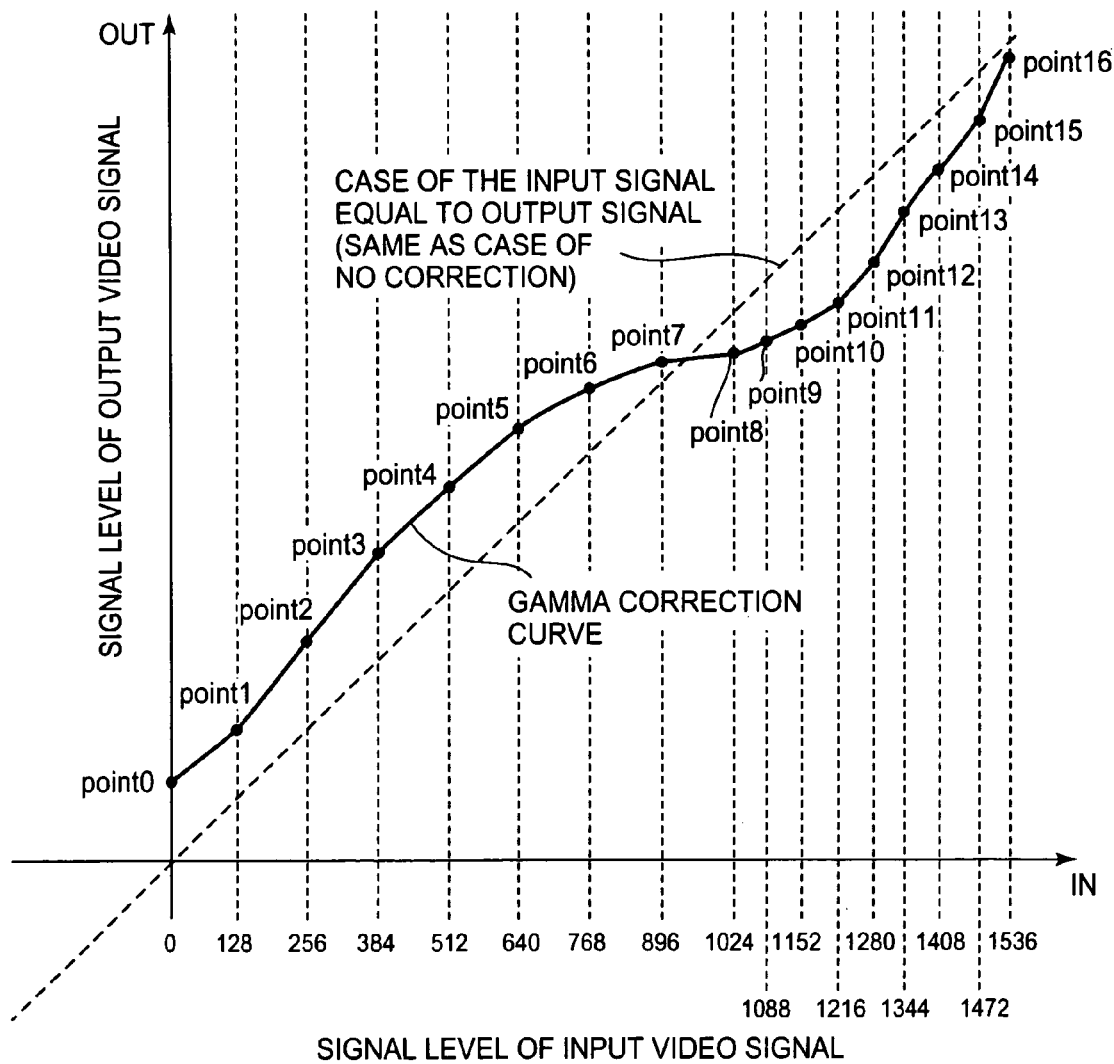
FIG. 8 is a chart for illustrating a correction curve according to a second exemplary embodiment of the present invention.

FIG. 8 is a chart for showing a correction curve according to the second exemplary embodiment. In the example given here, the sample points are set with the range of input video signal level from the signal level 0 (in decimal numbers) to the level of 1152 (in decimal numbers) being equidistantly partitioned with intervals of 128 levels and with the range of input video signal level from the level 1152 (in decimal numbers) to the level of 1536 (in decimal numbers) being equidistantly partitioned with intervals of 64 levels. The point added by the point addition processing in A second exemplary embodiment is a sample point at the level of 1088 (in decimal numbers), and the sample data point 9 is also added. The rest of the configuration of the second exemplary embodiment is the same as that shown in FIG. 5 for the first exemplary embodiment, so that the descriptions for this will not be given.

Figure 9:
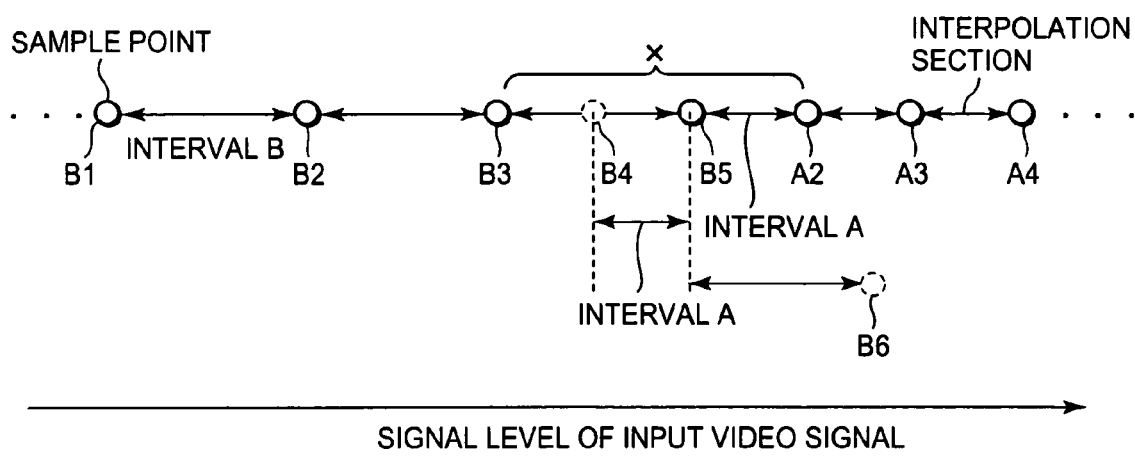
FIG. 9 is a chart for illustrating a non-equidistant section according to the second embodiment of the present invention.

FIG. 9 is a chart for illustrating a non-equidistant section of the second exemplary embodiment. The setting of the sample points in the non-equidistant section is shown with the intervals of 128 levels in FIG. 8 being expressed as intervals B and with the intervals of 64 levels in FIG. 8 being expressed as intervals A. In FIG. 9, while the signal level of the input video signal is plotted on the axis, the sample points B1 to B3, and B5 are set with intervals B in this order from the lowest signal level side, and the sample points B5, and A2 to A4 are set in this order from the lowest signal level side. The non-equidistant section is a section X shown in FIG. 9. The sample point located at the border between two non-equidistant intervals is the sample point B5. The sample point added by the point addition processing of the second exemplary embodiment is the sample point B4 indicated by ○ with a dotted line. For example, the sample point B5 is the point 10 in FIG. 8 while the sample point B4 is point 9 as described above. The interval between the sample point B4 and the sample point B5 is the interval A. In the second exemplary embodiment, interval B is larger than interval A. The wider intervals between the sample points (intervals B) exist on the lower-level side of the sample point B5 located at the border between two non-equidistant intervals.

Figure 10:
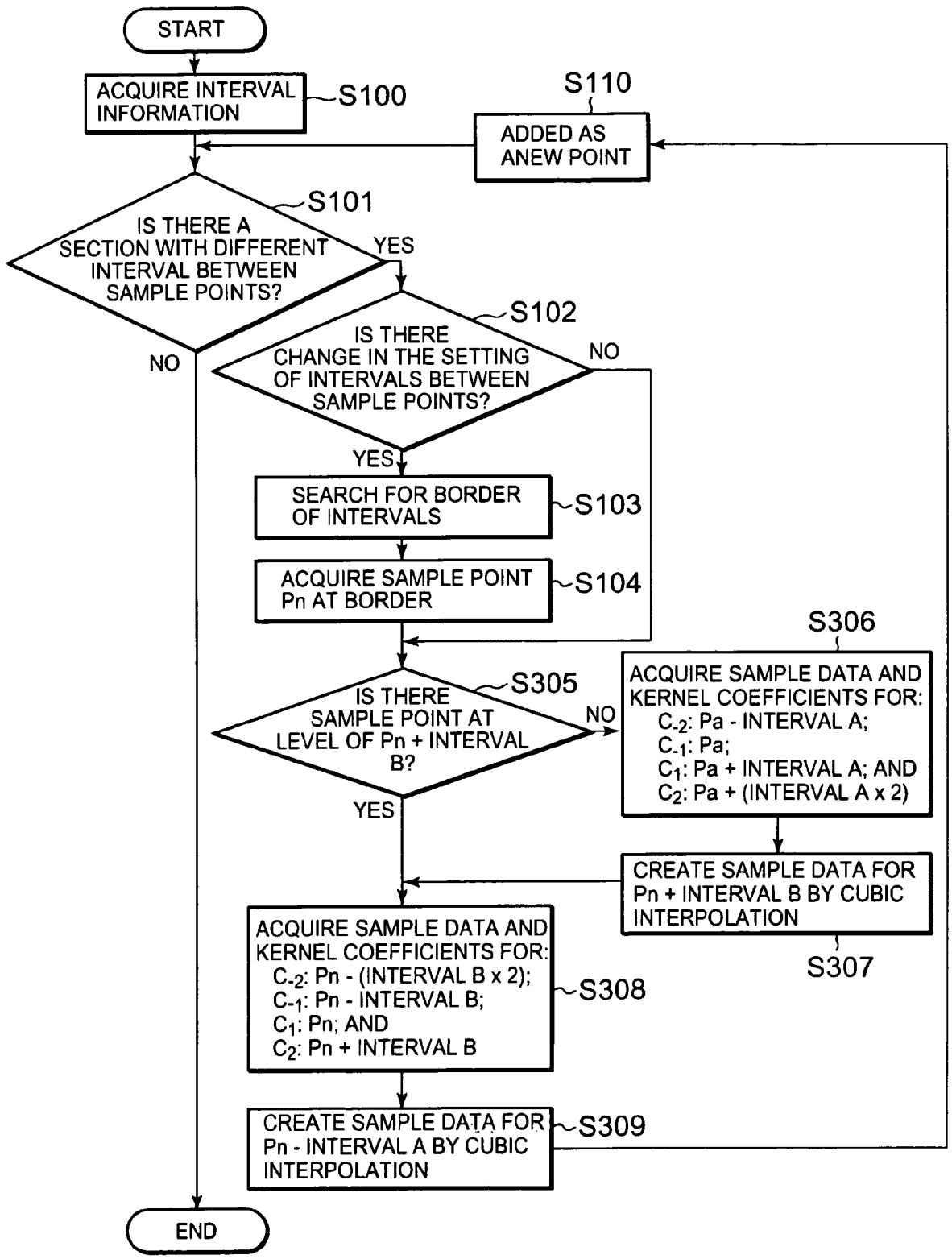
FIG. 10 is a flowchart for describing a point addition procedure for a non-equidistant section according to the second embodiment of the present invention.
Figure 11:
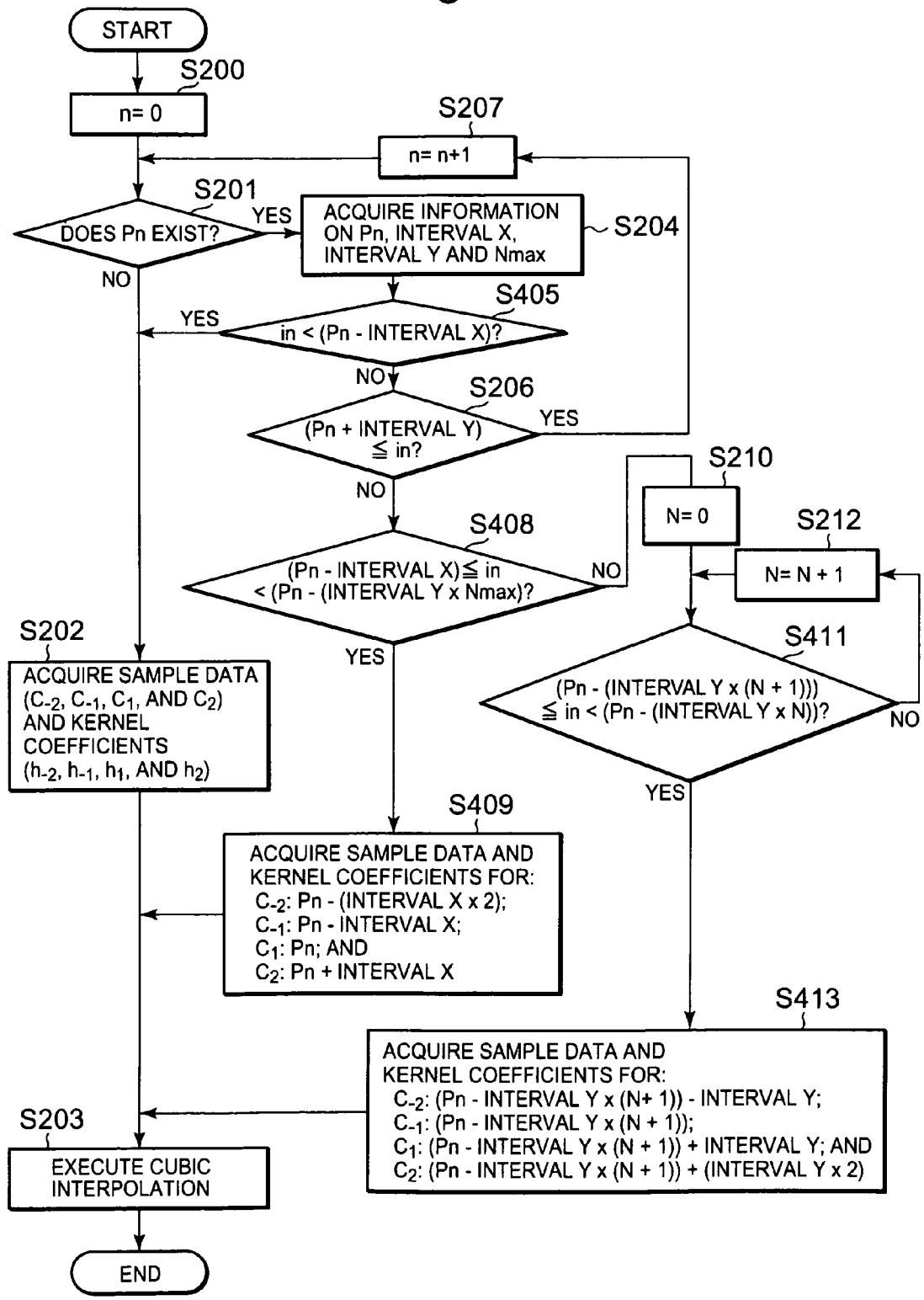
FIG. 11 is a flowchart for describing a processing procedure of point selection and gamma correction for a non-equidistant section according to the second embodiment of the present invention.

FIG. 10 is a flowchart of the point addition procedure for the non-equidistant section according to the second exemplary embodiment. FIG. 11 is a flowchart showing the processing procedure of the point selection and the gamma correction for the non-equidistant section according to the second exemplary embodiment. Here, step S305, step S306, step S307, step S308, and step S309 in FIG. 10 will be described. Pn in FIG. 10 is, for example, the sample point B5 in FIG. 9. The other steps and the other configuration are the same as those shown in FIG. 4 for the first exemplary embodiment, so that no descriptions thereof will be given.

At step S305, whether there is a sample point at the level of Pn+interval B is checked. When there is no such sample point, the operational flow proceeds to step S306. When there is such a sample point, the operational flow proceeds to step S308.

At step S306, the non-equidistant section determination circuit 26 adds a sample point at the level of Pn+interval B. This sample point is, for example, the sample point B6 shown in FIG. 9. In order to create sample data for this added sample point B6, the non-equidistant section determination circuit 26 outputs a sample point selection signal to the sample data selection circuit 22, and also outputs a sample point coefficient signal to the coefficient selection circuit 24.

On the basis of the sample point selection signal, the sample data selection circuit 22 selects two sample points positioned near the input video signal level of Pn+interval B and on the lower-level side of the input video signal level. Specifically, the selected sample points are: a sample point at the level of Pa−interval A (the sample point B5 in FIG. 9); and a sample point at the level of Pa (the sample point A2 in FIG. 9). Pa refers to a sample point positioned on the lower input video signal level side of the level of Pn+interval B and positioned closest to the level of Pn+interval B. In FIG. 9, for example, Pn is the sample point B5, and the sample point at the level of Pn+interval B is the sample point B6. The sample point Pa positioned on the lower-level side of the sample point B6 and positioned closest to the sample point B6 is the sample point A2. In addition, Pa−interval A=B5, Pa+interval A=A3, and Pa+interval A×2=A4. Moreover, on the basis of the sample point selection signal, the sample data selection circuit 22 selects two sample points positioned near the input video signal level and on the higher-level side of the input video signal level. Specifically, the selected sample points are: a sample point A3 at the level of Pa+interval A; and a sample point A4 at the level of Pa+interval A×2. In this way, the sample data selection circuit 22 selects the four sample points in total, and acquires, from the sample data register 21, sample data ($C_{-2}$, $C_{-1}$, $C_1$, and $C_2$) corresponding respectively to the four sample points as sample data signals.

The coefficient selection circuit 24 executes coefficient selection on the basis of a sample point coefficient signal, and acquires, from the kernel coefficient memory 23, kernel coefficient values ($h_{-2}$, $h_{-1}$, $h_1$, and $h_2$) as coefficient value signals.

The sample data signals ($C_{-2}$, $C_{-1}$, $C_1$, and $C_2$) acquired by the sample data selection circuit 22 at step S306 are outputted to the interpolation computation circuit 25. The kernel coefficient value signals ($h_2$, $h_{-1}$, $h_1$, and $h_2$) acquired by the coefficient selection circuit 24 are outputted also to the interpolation computation circuit. The interpolation computation circuit 25 executes cubic interpolation computation by use of these sample data signals ($C_{-2}$, $C_{-1}$, $C_1$, and $C_2$) and of the coefficient value signals ($h_{-2}$, $h_{-1}$, $h_1$, and $h_2$). The outcome of the interpolation computation is stored, as the sample data for the level of Pn+interval B, in the sample data register 21 (step S307). Then, the operational flow proceeds to step S308.

At step S308, from the sample data register 21 shown in FIG. 1, the sample data selection circuit 22 shown in FIG. 1 selects: the sample data of the sample point at the level of Pn−(interval B x 2) as the sample data $C_{-2}$; the sample data of the sample point at the level of Pn−interval B as the sample data $C_{-1}$; the sample data of the sample point at the level of Pn as the sample data $C_1$; and the sample data of the sample point at the level of Pn+interval B as the sample data $C_2$. The rest of the procedure of step S308 is the same as that of step S108 of FIG. 3, and will not be described here. At step S308, the sample data and the kernel coefficients are acquired, and at step S309, a sample point is added at the level of Pn−interval A. Next, step S405, step S408, step S409, step S411, and step S413 in FIG. 11 will be described. Other steps and configuration are the same as those shown in FIG. 7 for Embodiment, and will not be described here.

At step S405, whether the video signal in is lower than the level of (Pn−interval X) is checked. When the video signal in is lower than that level, the operational flow proceeds to step S202. When the video signal in is not lower than that level, the operational flow proceeds to step S206. At step S408, whether the relationship (Pn−interval X)≦in<(Pn−(interval Y×Nmax)) is satisfied is checked. When the relationship (Pn−interval X)≦in<(Pn−(interval Y×Nmax)) shown at step S408 is satisfied, the operational flow proceeds to step S409. When the relationship is not satisfied, the operational flow proceeds to step S210.

At step S409, from the sample data register 21 shown in FIG. 1, the sample data selection circuit 22 shown in FIG. 1 selects: the sample data of the sample point at the level of Pn−(interval X×2) as the sample data $C_{-2}$; the sample data of the sample point at the level of Pn−interval B as the sample data $C_{-1}$; the sample data of the sample point at the level of Pn as the sample data $C_1$; and the sample data of the sample point at the level of Pn+interval X as the sample data $C_2$. The rest of the procedure of step S409 is the same as that of step S209 of FIG. 7, and will not be described here. At step S409, the sample data and the kernel coefficients are acquired, and the operational flow proceeds to step S203.

At step S411, whether the relationship (Pn−(interval Y×(N+1)))≦in<(Pn−(interval Y×N)) is satisfied is checked. When the relationship (Pn−(interval Y×(N+1))≦in<(Pn−(interval Y×N)) shown at step S411 is satisfied, the operational flow proceeds to step S413. When the relationship is not satisfied, the operational flow proceeds to step S212.

At step S413, from the sample data register 21 shown in FIG. 4, the sample data selection circuit 22 shown in FIG. 1 selects: the sample data of the sample point at the level of Pn−(interval Y×(N+1))−interval Y as the sample data $C_{-2}$; the sample data of the sample point at the level of Pn−(interval Y×(N+1)) as the sample data $C_{-1}$; the sample data of the sample point at the level of Pn−(interval Y×(N+1))+interval Y as the sample data $C_1$; and the sample data of the sample point at the level of Pn−(interval Y×(N+1))−(interval Y×2) as the sample data $C_2$. The rest of the procedure of step S413 is the same as that of step S213 of FIG. 7, and will not be described here. At step S413, the sample data and the kernel coefficients are acquired, and the operational flow proceeds to step S203.

The second exemplary embodiment includes a procedure for point addition processing shown in FIG. 10 and a procedure for gamma correction shown in FIG. 11. Accordingly, gamma correction by means of cubic interpolation computation is possible even in a case where, while the input video signal level is plotted on the axis, the intervals between sample points located on the lower-level side of the sample point of the border point are wider than the intervals between sample points located on the higher-level side of the sample point of the border point.

A Third Exemplary Embodiment

Figure 12:
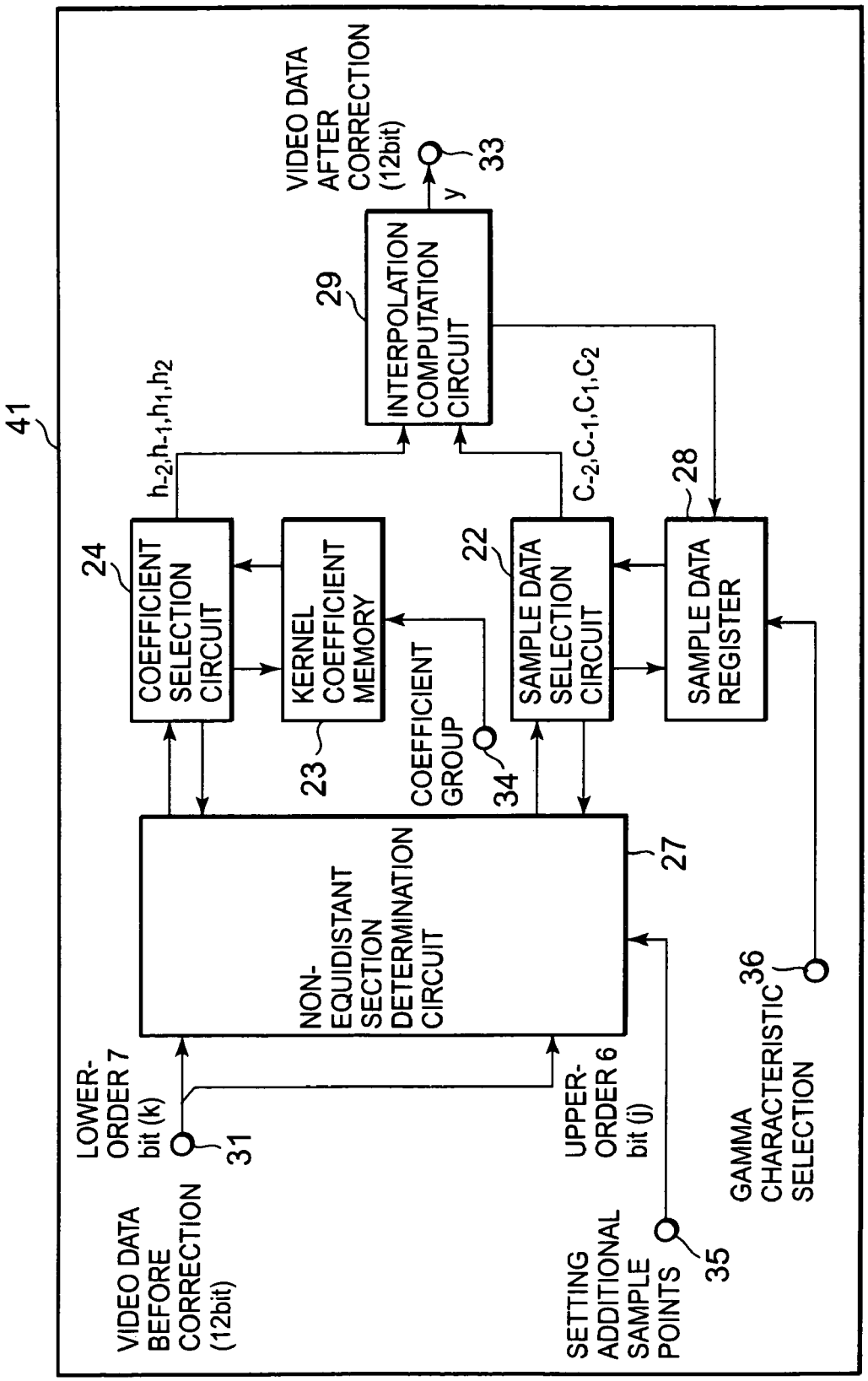
FIG. 12 is a block diagram for illustrating a gamma correction apparatus according to a third exemplary embodiment of the present invention.
Figure 13:
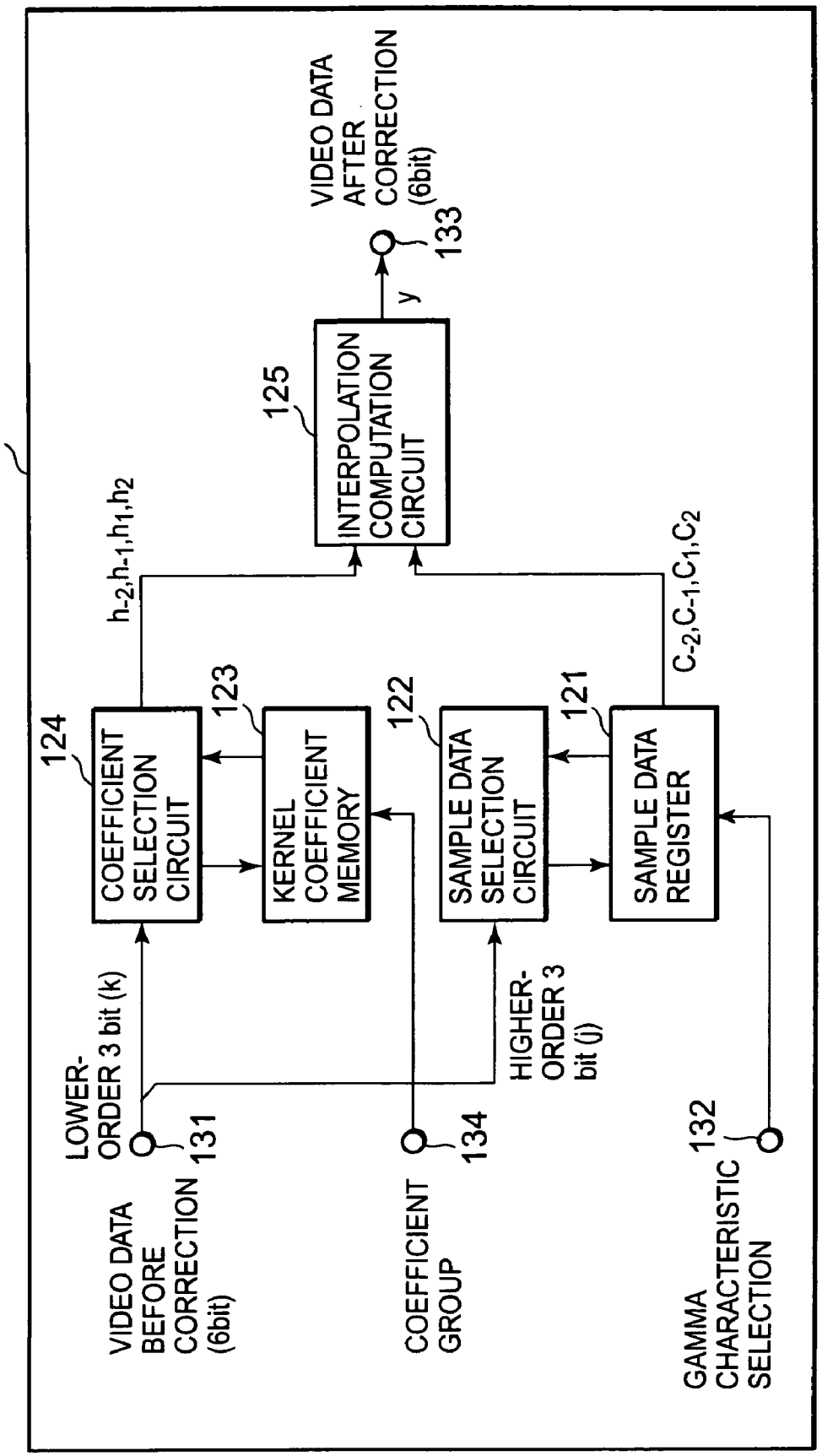
FIG. 13 is a block diagram for illustrating a degamma correction apparatus of an example described in Patent Document 1.

FIG. 12 is a block diagram for illustrating a gamma correction apparatus according to a third exemplary embodiment of the present invention. In the first exemplary embodiment, the non-equidistant section determination circuit 26 sets the additional point. In this third exemplary embodiment, however, a gamma correction apparatus 41 is provided with a terminal 35 for setting additional sample points, and an additional sample point signal is inputted from the terminal 35 for setting additional sample points into a non-equidistant section determination circuit 27. In addition, additional sample data as a sample data register write signal is inputted into a sample data register 28 through a terminal 36 for selecting gamma characteristics which include additional sample data. Accordingly, the input of the video data after correction from an interpolation computation circuit 29 is not necessary any longer. To put it differently, the interpolation computation circuit 29 outputs the video signal only to the input terminal for video data after correction. The rest of the configuration, such that the non-equidistant section determination circuit 27 outputs the sample point coefficient signal to a coefficient selection circuit 24 and output the sample point selection signal to the sample data register 28, is similar to the counterpart in the first exemplary embodiment, and will not be described here.

The operation of the gamma correction apparatus 41 according to the third exemplary embodiment will be described below. The gamma correction apparatus 41 according to the third exemplary embodiment executes point addition processing by making information on sample points be directly inputted from the terminal 35 for setting additional sample points into the non-equidistant section determination circuit 27 and by making the write signal and the additional sample data be directly inputted into the sample data register 28 from the terminal 36 for selecting gamma characteristics which include additional sample data. Both the information on sample points inputted from the terminal 35 for setting additional sample points and the additional sample data inputted from the terminal 36 for selecting gamma characteristics which include additional sample data are created outside of the gamma correction apparatus 41 by means of software or the like.

In the third exemplary embodiment, the gamma correction apparatus 41 does not create, in the gamma correction apparatus 41 per se, the information on additional samples or the additional sample data. Instead, the gamma correction apparatus executes the point addition processing by making the information and the data be directly inputted from the outside through the terminal 35 for setting additional sample points and through the terminal 36 for selecting gamma characteristics which includes additional sample data. Accordingly, the third exemplary embodiment has similar effects to those obtained by the first exemplary embodiment, and has, in addition, an effect of downsizing the circuit.

As in the case of the first exemplary embodiment described above, the gamma correction apparatus 41 according to the third exemplary embodiment converts the level of the inputted video signal for every single sample, and outputs a video signal that has been processed by the degamma correction. Accordingly, in the gamma correction apparatus 41, no reference to a large-scale look up table or no high-order computation is carried out. For this reason, the gamma correction on video signals is executed by means of a simple configuration having a small-scale circuit and requiring a small amount of computation.

It should be noted that the embodiments described above are not the only ways of carrying out the present invention. Various modifications are possible without departing from the scope of the present invention.

For example, descriptions in the embodiments described above are based on the assumption that the invention is carried out as a hardware configuration, but this is not the only way. Any processing selected arbitrarily can be implemented by making a CPU (central processing unit) execute a computer program. In this case, the computer program can be provided in a form of a recording medium that stores the program. Besides, the computer program can be provided by being transmitted via the internet or other transmitting media.

In addition, descriptions in the embodiments described above are based on the assumption that the invention is carried out as a gamma correction apparatus, the invention can be applied to the degamma correction processing for removing the gamma correction from a video signal that has been processed by the gamma correction.

Moreover, the gamma correction apparatus 11 may be modified so that the sample data stored in the sample data register 21 can be changed from outside when necessary. For example, new sample data may be inputted from outside. Alternatively, plural patterns of sample data may be stored in the sample data register 21, and the patterns are switched from one to another on the basis of a control signal from outside. Accordingly, for example, even in a case where a video signal having been processed by gamma correction with different characteristics is inputted, or even in a case where a display with different gamma characteristics is connected, the gamma correction apparatus 11 can easily respond to the differences of these video signals. In addition, even in a case where the amounts of gamma correction for R signal, G signal, and B signal differ from one another, the gamma correction apparatus 11 can appropriately handle the situation by switching the patterns of sample data in accordance with the kind of signal being inputted.

In addition, the kernel coefficient memory 23 of the gamma correction apparatus 11 can be provided in a form of a RAM or of a ROM. When a RAM is used for the purpose, coefficient groups from an outside controller can be stored when necessary. Accordingly, for example, when the intervals between sample data are changed, a suitable kernel coefficient adjusted for the new interval between sample data can be stored from outside.

Moreover, in the embodiments described above, the number of the coefficients stored in the kernel coefficient memory 23 of the gamma correction apparatus 11 corresponds to the quantization steps of the inputted video signal. The number of the coefficients stored in the kernel coefficient memory 23, however, can be reduced down to a number that is smaller than the number corresponding to the quantization steps of the inputted video signal. In this case, the coefficient selected by the coefficient selection circuit 24 may not sometimes be found in the kernel coefficient memory 23. Accordingly, when a necessary kernel coefficient does not exist, a coefficient approximated using other coefficients by interpolation, such as linear interpolation, can be calculated by use of an interpolation circuit (not illustrated) to execute linear interpolation or the like provided between the coefficient selection circuit 24 and the kernel coefficient memory 23.

Furthermore, the descriptions of the gamma correction apparatus 11 are based on the assumption that the bit number of the inputted video signal is twelve. The bit number is not limited to twelve, but other numbers may also be used for the purpose. For example, when the bit number of the video signal is m (m is a natural number), the higher-order p bits of the m bits (p is a natural number that is smaller than m) may be supplied to the sample data selection portion 22 while the lower-order q bits of the m bits (p+q=m) may be supplied to the coefficient selection circuit 24. In this case, the number of partitions for the sample data is q.

While the invention has been described in terms of several exemplary embodiments, those skilled in the art will recognize that the invention can be practiced with modification within the spirit and scope of the appended claims.

Further, it is noted that Applicant's intent is to encompass equivalents of all claim elements, even if amended later during prosecution.

What is claimed is:

1. A video signal processing apparatus, comprising:
a section determination unit which detects a non-equidistant section having different intervals between a plurality of sample points set for a range from a minimum signal level to a maximum signal level of a video signal to be inputted;
a correction level holding unit which holds a signal level of a video signal after correction for each sample point as a correction level; and
an interpolation computation unit which obtains a signal level of the video signal after correction corresponding to the signal level of the inputted video signal by executing cubic interpolation computation with reference to the correction level held by the correction level holding unit,
wherein, with a border point defined as a sample point to be a border between a first section located on a lower signal level side and having intervals of X (X>0) between sample points, and a second section located on a higher signal level side and having intervals of Y (Y>0, X.noteq.Y) between sample points, the signal level of the video signal after correction is obtained by use of the correction level of a sample point added or designated so as to form at least one of the second section on the lower signal level side and the first section on the higher signal level side of the border point,
in a case where $X \geq nY$ (n is an integer larger than 1), a sample point is added on the lower signal level side of the border point and at a position having a distance Y from the border point, and another sample point is added on the higher signal level side of the border point and at a position having a distance X from the border point, and
in a case where $nX \leq Y$ (n is an integer larger than 1), a sample point is added on the higher signal level side of the border point and at a position having a distance X from the border point, and another sample point is added on the lower signal level side of the border point and at a position having a distance Y from the border point.

2. A video signal processing apparatus comprising:
a section determination unit which detects a non-equidistant section having different intervals between a plurality of sample points set for a range from a minimum signal level to a maximum signal level of a video signal to be inputted;

a correction level holding unit which holds a signal level of a video signal after correction for each sample point as a correction level; and an interpolation computation unit which obtains a signal level of the video signal after correction corresponding to the signal level of the inputted video signal by executing cubic interpolation computation with reference to the correction level held by the correction level holding unit, wherein, with a border point defined as a sample point to be a border between a first section located on a lower signal level side and having intervals of X(X>0) between sample points, and a second section located on a higher signal level side and having intervals of Y (Y>0, X≠Y) between sample points, the signal level of the video signal after correction is obtained by use of the correction level of a sample point added or designated so as to form at least one of the second section on the lower signal level side and the first section on the higher signal level side of the border point;

a sample data selection circuit configured to select two sample points located at a position on the higher signal level side of the signal level of the inputted video signal and close to the signal level of the inputted video signal and another two sample points located at a position on the lower signal level side of the signal level of the inputted video signal and close to the signal level of the inputted video signal, and to acquire, from the correction level holding unit, the correction level corresponding to each of the four selected sample points; and a coefficient selection circuit configured to acquire a coefficient for cubic interpolation computation on the basis of a kernel function with a variable normalized by a distance between two adjacent sample points, wherein the coefficient selection circuit acquires four coefficients calculated by inputting, into the variable of the kernel function, distances from the signal level of the inputted video signal to the respective sample points selected by the sample data selection circuit, and the interpolation computation unit executes cubic interpolation computation on the basis of the four correction levels acquired by the sample data selection circuit and of the coefficients acquired by the coefficient selection circuit.

3. The video signal processing apparatus according to claim 2, wherein the section determination unit adds a sample point so as to form at least one of the second section on the lower signal level side and the first section on the higher signal level side, and the interpolation computation unit creates the correction level for the added sample point, inputs the correction level into the correction level holding unit, and obtains the signal level of the video signal after correction by referring to the correction level thus created.

4. The video signal processing apparatus according to claim 2, wherein a sample point and the correction level for the sample point are added by being inputted from outside so as to form at least one of the second section on the lower signal level side and the first section on the higher signal level side, and the interpolation computation unit obtains the signal level of the video signal after correction by referring to the added sample point and the correction level for the added sample point.

5. The video signal processing apparatus according to claim 2, wherein the interpolation computation unit obtains the correction level of a first additional sample point located on the lower signal level side of the border point and at a position having a distance Y from the border point, and obtains the correction level of a second additional sample point located on the higher signal level side of the border point and at a position having a distance X from the border point, in a case where $X \geq nY$ (n is an integer larger than 1 and is the maximum integer that satisfies $X \geq nY$), the interpolation computation unit executes interpolation computation for a section from (the border point−X) to (the border point−Y) by referring to the second additional sample point and the correction level of the second additional sample point, and executes interpolation computation for a section from (the border point−Y) to the border point by referring to the first additional sample point and the correction level of the first additional sample point, and in a case where $mX \leq Y$ (m is an integer larger than 1 and is the maximum integer that satisfies $mX \leq Y$), the interpolation computation unit executes interpolation computation for a section from the border point to the border point+X by referring to the second additional sample point and the correction level of the second additional sample point, and executes interpolation computation for a section from the border point+X to (the border point+Y) by referring to the first additional sample point and the correction level of the first additional sample point.

6. The video signal processing apparatus according to claim 2, further comprising:

a coefficient memory which stores a coefficient group corresponding to the kernel function, wherein the coefficient selection circuit retrieves a coefficient corresponding to a distance from the coefficient group stored in the coefficient memory.

7. The video signal processing apparatus according to claim 6, wherein the coefficient memory is configured to allow the coefficient group to be written from an external apparatus.

8. A display apparatus configured to display an inputted video signal comprising a gamma correction unit that is configured to execute any one of gamma correction and degamma correction on the inputted video signal, said gamma correction unit comprising the video signal processing apparatus defined by claim 2.

9. A video signal processing method comprising:

detecting a border point, the border point being a sample point located in a non-equidistant section having different intervals between a plurality of sample points set for a range from a minimum signal level to a maximum signal level of a video signal to be inputted, and the border point being a border between a first section located on a lower signal level side and having intervals of X(X>0) between sample points, and a second section located on a higher signal level side and having intervals of Y(Y>0, X≠Y) between sample points; and obtaining a signal level of a video signal after correction corresponding to the signal level of the inputted video signal by executing cubic interpolation computation, the cubic interpolation computation being executed by referring to the correction level held in a correction level holding unit configured to hold the signal level of the video signal after correction for each sample point as the correction level, and the cubic interpolation computation being executed by use of the correction level for a sample point added or designated so as to form at least one of the second section on the lower level side and the first section on the higher level side of the border point,
wherein two sample points located at a position on the higher signal level side of the signal level of the inputted video signal and close to the signal level of the inputted video signal and another two sample points located at a position on the lower signal level side of the signal level of the inputted video signal and close to the signal level of the inputted video signal are selected, and the correction level corresponding to each of the four selected sample points is acquired, and
a coefficient for cubic interpolation computation is acquired by inputting the distances from the signal level of the inputted video signal to the respective ones of the selected sample points into a variable of a kernel function while the variable is normalized by the distance between two adjacent sample points, and
cubic interpolation computation is executed on the basis of the four correction levels and the coefficients.

10. The video signal processing method according to claim 9, wherein
a sample point is added so as to form at least one of the second section on the lower signal level side and the first section on the higher signal level side of the border point,
the correction level for the added sample point is created by referring to the correction levels held in the correction level holding unit,
the created correction level is inputted into the correction level holding unit, and
the signal level of the video signal after correction is obtained by referring to the correction level thus created and held in the correction level holding unit.

11. The video signal processing method according to claim 9, wherein
a sample point and the correction level for the sample point are added by inputting from outside so as to form at least one of the second section on the lower signal level side and the first section on the higher signal level side, and
the signal level of the video signal after correction is obtained by referring to the added sample point and the correction level for the added sample point.

12. The video signal processing method according to claim 9, wherein
in a case where $X \geq nY$ (n is an integer larger than 1), a sample point is added on the lower signal level side of the border point and at a position having a distance Y from the border point, and another sample point is added on the higher signal level side of the border point and at a position having a distance X from the border point, and
in a case where $nX \leq Y$ (n is an integer larger than 1), a sample point is added on the higher signal level side of the border point and at a position having a distance X from the border point, and another sample point is added on the lower signal level side of the border point and at a position having a distance Y from the border point.

13. The video signal processing method according to claim 9, wherein
the correction level of a first additional sample point located on the lower signal level side of the border point and at a position having a distance Y from the border point and the correction level of a second additional sample point located on the higher signal level side of the border point and at a position having a distance X from the border point are obtained,
in a case where $X \geq nY$ (n is an integer larger than 1 and is a maximum integer that satisfies $X \leq nY$), interpolation computation for a section from (the border point−X) to (the border point−Y) is executed by referring to the second additional sample point and the correction level of the second additional sample point, and interpolation computation for a section from (the border point−Y) to the border point is executed by referring to the first additional sample point and the correction level of the first additional sample point, and
in a case where $mX \leq Y$ (m is an integer larger than 1 and is a maximum integer that satisfies $mX \leq Y$), interpolation computation for a section from the border point to the border point+X is executed by referring to the second additional sample point and the correction level of the second additional sample point, and interpolation computation for a section from the border point+X to (the border point+Y) is executed by referring to the first additional sample point and the correction level of the first additional sample point.

\* \* \* \* \*